United States Patent
Shaw et al.

(10) Patent No.: US 10,460,308 B2
(45) Date of Patent: Oct. 29, 2019

(54) CROWD-LOCATION BASED TRANSACTIONS

(71) Applicant: AT&T Intellectual Property I, L.P., Atlanta, GA (US)

(72) Inventors: Venson Shaw, Kirkland, WA (US); Mark Easley, Frisco, TX (US)

(73) Assignee: AT&T INTELLECTUAL PROPERTY I, L.P, Atlanta, GA (US)

( * ) Notice: Subject to any disclaimer, the term of this patent is extended or adjusted under 35 U.S.C. 154(b) by 531 days.

(21) Appl. No.: 14/824,746

(22) Filed: Aug. 12, 2015

(65) Prior Publication Data
US 2017/0046683 A1 Feb. 16, 2017

(51) Int. Cl.
*G06Q 20/32* (2012.01)
*G06Q 20/40* (2012.01)
(Continued)

(52) U.S. Cl.
CPC ......... *G06Q 20/3224* (2013.01); *G06Q 20/40* (2013.01); *G06Q 30/0202* (2013.01); *H04W 4/021* (2013.01)

(58) Field of Classification Search
CPC ........... G06Q 20/3224; G06Q 30/0202; G06Q 20/40; H04W 4/021
(Continued)

(56) References Cited

U.S. PATENT DOCUMENTS

| | | | |
|---|---|---|---|
| 5,905,461 | A | 5/1999 | Neher |
| 6,226,622 | B1 | 5/2001 | Dabbiere |

(Continued)

FOREIGN PATENT DOCUMENTS

| | | |
|---|---|---|
| CA | 2770069 | 2/2011 |
| WO | 03060847 A1 | 7/2003 |

(Continued)

OTHER PUBLICATIONS

SPOT Trace® Services, Spot Ready for Adventure, findmespot.com, http://findmespot.com/en/index.php?cid=129, last accessed Mar. 12, 2015.
(Continued)

*Primary Examiner* — James H Austin
(74) *Attorney, Agent, or Firm* — Amin, Turocy & Watson, LLP

(57) ABSTRACT

Crowd-location based analytics for transactions are provided. An assembly of mobile devices in a cell sector (or, in some embodiments, a cell) of wireless coverage can be determined. The assembly can be referred to as a crowd and can comprise a number of mobile devices greater than the cell sector's average device occupation. Organization entities located within the cell sector also can be identified. A demand or interest for an asset (e.g., a service or merchandise) can be determined for the mobile device based at least on a device profile. The demand or interest can be associated with the organization entity that can provide the asset. Promotional information related to the asset can be sent to the mobile device and/or a device associated with the organization entity. The mobile device can present at least a portion of such information and a transaction related to the asset can be performed otherwise facilitated.

20 Claims, 16 Drawing Sheets

(51) Int. Cl.
*G06Q 30/02* (2012.01)
*H04W 4/021* (2018.01)

(58) Field of Classification Search
USPC ............... 705/14.1, 14.19, 14.23, 14.25
See application file for complete search history.

(56) References Cited

U.S. PATENT DOCUMENTS

| | | | |
|---|---|---|---|
| 6,300,875 B1 | 10/2001 | Schafer | |
| 6,356,841 B1 | 3/2002 | Hamrick et al. | |
| 6,388,612 B1 | 5/2002 | Neher | |
| 6,720,879 B2 | 4/2004 | Edwards | |
| 6,813,498 B1 | 11/2004 | Durga et al. | |
| 6,957,217 B2 | 10/2005 | Raverdy et al. | |
| 7,099,921 B1 | 8/2006 | Engstrom et al. | |
| 7,203,502 B2 | 4/2007 | Wilson et al. | |
| 7,253,731 B2 | 8/2007 | Joao | |
| 7,259,668 B2 | 8/2007 | Casey | |
| 7,379,743 B2 | 5/2008 | Bostrom et al. | |
| 7,492,251 B1 | 2/2009 | Katz | |
| 7,551,126 B2 | 6/2009 | Loomis et al. | |
| 7,602,302 B2 | 10/2009 | Hokuf et al. | |
| 7,728,724 B1 | 6/2010 | Scalisi et al. | |
| 7,830,305 B2 | 11/2010 | Boling et al. | |
| 7,990,264 B2 | 8/2011 | Chou | |
| 8,035,510 B2 | 10/2011 | Pfafman et al. | |
| 8,073,467 B2 | 12/2011 | Gupta et al. | |
| 8,290,513 B2 | 10/2012 | Forstall et al. | |
| 8,301,158 B1 | 10/2012 | Thomas | |
| 8,315,905 B1 | 11/2012 | Adair | |
| 8,364,170 B2 | 1/2013 | Lohtia et al. | |
| 8,442,807 B2* | 5/2013 | Ramachandran | H04W 4/02 703/2 |
| 8,446,272 B2 | 5/2013 | Raduchel | |
| 8,447,325 B2 | 5/2013 | Anakata et al. | |
| 8,514,058 B2 | 8/2013 | Cameron | |
| 8,531,294 B2 | 9/2013 | Slavin et al. | |
| 8,558,694 B2 | 10/2013 | Brandt et al. | |
| 8,565,735 B2 | 10/2013 | Wohlwend et al. | |
| 8,589,488 B2 | 11/2013 | Huston et al. | |
| 8,606,612 B2 | 12/2013 | de Silva et al. | |
| 8,644,847 B1 | 2/2014 | Nelissen et al. | |
| 8,686,852 B2 | 4/2014 | Ben-Dayan et al. | |
| 8,700,659 B2 | 4/2014 | Skeen et al. | |
| 8,725,165 B2 | 5/2014 | Lau et al. | |
| 8,761,797 B1 | 6/2014 | Norton | |
| 8,768,375 B2 | 7/2014 | Farmer | |
| 8,825,084 B2 | 9/2014 | Hymel et al. | |
| 8,831,577 B2 | 9/2014 | Ginn et al. | |
| 8,838,566 B2 | 9/2014 | Vaananen | |
| 8,849,310 B2 | 9/2014 | Fan et al. | |
| 8,886,584 B1 | 11/2014 | Kane, Jr. et al. | |
| 8,924,250 B2 | 12/2014 | Bates et al. | |
| 8,989,773 B2 | 3/2015 | Sandel et al. | |
| 9,456,298 B2 | 9/2016 | Lee et al. | |
| 2003/0114171 A1 | 6/2003 | Miyamoto | |
| 2004/0185875 A1 | 9/2004 | Diacakis et al. | |
| 2007/0146199 A1 | 6/2007 | Huang et al. | |
| 2007/0214073 A1 | 9/2007 | Smith | |
| 2008/0032703 A1 | 2/2008 | Krumm et al. | |
| 2008/0153511 A1 | 6/2008 | Mock | |
| 2008/0262717 A1 | 10/2008 | Ettinger | |
| 2009/0315704 A1 | 12/2009 | Rosing | |
| 2010/0217525 A1 | 8/2010 | King et al. | |
| 2011/0053605 A1 | 3/2011 | Carpio et al. | |
| 2011/0083101 A1 | 4/2011 | Sharon et al. | |
| 2011/0105143 A1 | 5/2011 | Harple et al. | |
| 2011/0207440 A1 | 8/2011 | Ruuspakka et al. | |
| 2011/0234399 A1 | 9/2011 | Yan | |
| 2011/0238476 A1* | 9/2011 | Carr | G06Q 30/00 705/14.25 |
| 2011/0258049 A1 | 10/2011 | Ramer et al. | |
| 2011/0295677 A1 | 12/2011 | Dhingra et al. | |
| 2012/0101818 A1 | 4/2012 | Scott et al. | |
| 2012/0233067 A1 | 9/2012 | Matthew et al. | |
| 2012/0265841 A1 | 10/2012 | Ross et al. | |
| 2012/0271684 A1 | 10/2012 | Shutter | |
| 2012/0284100 A1 | 11/2012 | Goldberg | |
| 2012/0290336 A1 | 11/2012 | Rosenblatt et al. | |
| 2013/0013412 A1* | 1/2013 | Altman | G09F 21/04 705/14.61 |
| 2013/0060640 A1* | 3/2013 | Gadhia | G06Q 30/0251 705/14.58 |
| 2013/0090980 A1 | 4/2013 | Hummel | |
| 2013/0304578 A1 | 11/2013 | Kannan et al. | |
| 2013/0332527 A1 | 12/2013 | Du et al. | |
| 2014/0006069 A1 | 1/2014 | Guggenheim | |
| 2014/0019248 A1 | 1/2014 | Stoliartchouk et al. | |
| 2014/0046802 A1 | 2/2014 | Hosein et al. | |
| 2014/0074604 A1 | 3/2014 | Castillo et al. | |
| 2014/0094195 A1 | 4/2014 | Luo et al. | |
| 2014/0122040 A1 | 5/2014 | Marti | |
| 2014/0171024 A1 | 6/2014 | Huang et al. | |
| 2014/0213295 A1 | 6/2014 | Conklin | |
| 2014/0222562 A1 | 8/2014 | Akgul et al. | |
| 2014/0279014 A1 | 9/2014 | Roka et al. | |
| 2016/0142884 A1 | 5/2016 | Sears | |

FOREIGN PATENT DOCUMENTS

| | | |
|---|---|---|
| WO | 2007004999 A1 | 1/2007 |
| WO | 2012148657 | 4/2012 |

OTHER PUBLICATIONS iOS 7: Understanding Location Services, Apple, support.apple.com, https://support.apple.com/en-us/HT201357, last accessed Mar. 12, 2015.

GPS, Broadcom, broadcom.com, http://www.broadcom.com/products/GPS, last accessed Mar. 12, 2015.

Enable Android location access, Google, support.google.com, https://support.google.com/coordinate/answer/2569281?hl=en, last accessed Mar. 12, 2015.

About T-Mobile, T-Mobile, t-mobole.com, http://www.t-mobile.com/company/privacyresources.aspx?tp=Abt_Tab_LocationServices, last accessed Mar. 12, 2015.

"Emergency Beacons, NOAA: Search and rescue satellite aided tracking, sarsat.noaaa.govhttp://www.sarsat.noaa.gov/emerbcns.html, last accessed Mar. 12, 2015."

"Outlander Real-Time GPS Tracker, Spyguy Security, www.spyguysecurity.com, http://www.spyguysecurity.com/collections/gps-tracking/products/outlander-portable-real-time-gps-tracker, last accessed Mar. 12, 2015.".

GPS Tracker: Micro Tracker, Spy Spot Investigation, shop.spy-spot.com, http://shop.spy-spot.com/gps-tracker, last accessed Mar. 12, 2015.

The only choice to protect your business assets, Lightning GPS, lightninggps.com, http://www.lightninggps.com/gps_asset_tracking/, last accessed Mar. 12, 2015.

Steinfield, Charles. "The development of location based services in mobile commerce." E-Life after the Dot Com Bust. Physica-Verlag HD, 2004. 177-197. http://link.springer.com/chapter/10.1007/978-3-662-11659-3_10.

"Free Trend Report: Why Location is the New Currency of Marketing. ScreenMedia Daily, screenmediadaily.com, http://screenmediadaily.com/free-trend-report-why-location-is-the-new-currencyof-marketing/" last accessed Mar. 14, 2015.

Georgiev et al, "Where Businesses Thrive: Predicting the Impact of the Olympic Games on Local Retailers through Location-based Services Data." arXiv preprint arXiv:1403.7654, 2014.

Dilmene, et al."Location Based Sales Promotion Strategies," International Conference on Marketing & Consumer Behavior, 2013.

Office Action dated Dec. 28, 2016 for U.S. Appl. No. 14/817,800, 27 pages.

Office Action dated Jun. 14, 2017 for U.S. Appl. No. 14/817,800, 15 pages.

Office Action dated Dec. 26, 2017 for U.S. Appl. No. 14/817,859, 40 pages.

(56) References Cited

OTHER PUBLICATIONS

Final Office Action dated Apr. 30, 2018 for U.S. Appl. No. 14/817,859, 32 pgs.
Office Action dated Jan. 31, 2019 for U.S. Appl. No. 14/817,859, 26 pages.
Office Action dated Oct. 3, 2018 for U.S. Appl. No. 14/817,859, 30 pages.
Office Action dated Sep. 14, 2018 for U.S. Appl. No. 15/901,661, 22 pages.
Office Action dated Aug. 9, 2019 for U.S. Appl. No. 14/817,859, 27 pages.

* cited by examiner

CROWD-LOCATION BASED TRANSACTIONS

TECHNICAL FIELD

This application relates to location-based transactions based on, for example, location of a group or crowd of mobile devices.

BACKGROUND

Applications for location services for mobile devices have exploded in recent years. Conventional location-based services are typically directed to a specific mobile device and can provide commercial opportunities that may be customized to the mobile device. However, while customized, such commercial opportunities usually yield a small number of transactions because they tend to be overly focused on the mobile device, without significant inclusion of other factor that may affect engagement in a commercial transaction.

DETAILED DESCRIPTION

Figure 1:
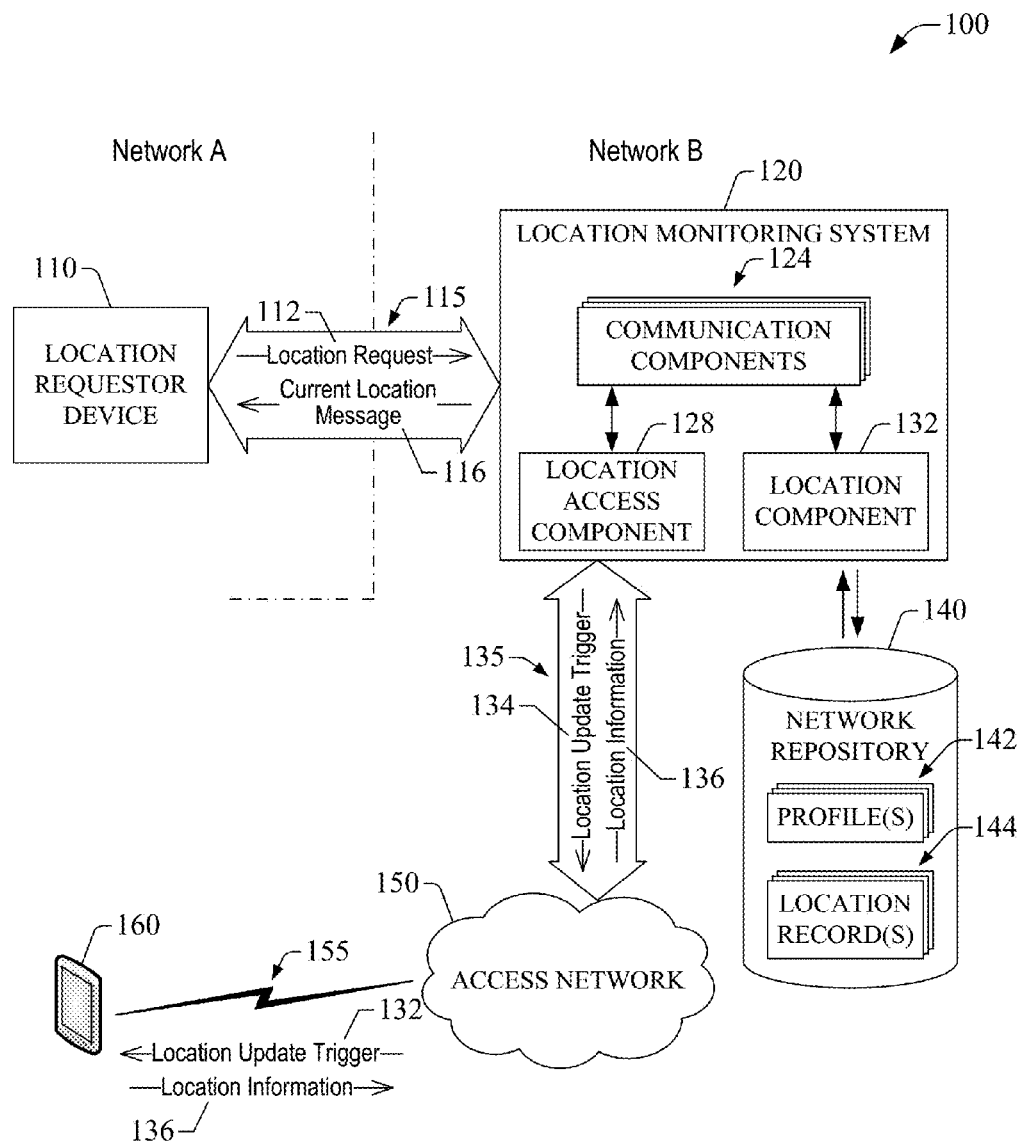
FIG. 1 presents an example of an operational environment for determination of a location of a mobile device in accordance with one or more embodiments of the disclosure.

The disclosure recognizes and addresses, in at least some embodiments, the issue of location-based analytics for commercial transactions or other type of transactions. The location-based analytics can be based, in some implementations, on location of a group of user devices respectively associated with subscribers or other type of consumers, where the group can be collectively referred to as a "crowd." Embodiments of the disclosure comprise systems, apparatuses, devices, computer-accessible storage devices that, individually or in combination, can permit or otherwise facilitate crowd-location based transactions (commercial or otherwise). More specifically, embodiments of the disclosure can permit or otherwise facilitate detection of formation or presence of an assembly of mobile devices in a cell sector and/or a cell of wireless coverage. The assembly can be referred to as a crowd and can include a number of mobile devices that is greater than the cell sector's average device occupation over a defined time interval. In addition or in some embodiments, organization entities (such as a business entity) located within the cell sector also can be identified. For a mobile device in the assembly, a demand or interest for an asset can be determined based at least on a device profile of the mobile device. Further or in other embodiments, the demand or interest can be associated with the organization entity, which can provide the asset (e.g., a service or merchandise). Information related to the asset can be sent to the mobile device and/or a device associated with the organization entity. In at least some embodiments, the mobile device can present at least a portion of such information and a transaction related to the asset can be performed otherwise facilitated in response to a selection at the mobile device.

As described in greater detail below, embodiments of the disclosure can provide a client-server architecture can permit implementing the analytics. A client device can be embodied in a user device (e.g., a mobile device) and can include a component, such as a dedicated software application or module, associated with specific transactions in the user device. A server platform can be embodied in or can include a server device deployed within a business premises or at a backend network associated with a service provider. In addition or in some embodiments, the backend network can be coupled to the client device and/or the server platform.

In some embodiments, the backend network (or a system thereof) can partition a geographical map according to cell sectors. In addition or in another embodiment, the backend network (or the system thereof) can identify one or more of the businesses that are present within a cell sector that constitutes the partition. The backend network (or the system thereof) also can identify businesses present in each cell sector in partition. Further or in another embodiment, the backend network (or the system thereof) can maintain records of the identified business(es) within a cell sector. A record of a business can be updated continuously, semi-continuously, periodically, or according to a schedule of specific times. Furthermore or in yet another embodiment, the backend network (or the system thereof) can monitor presence and/or location of one or more mobile devices in at least one of the cell sectors that form the partition. The backend network (or the system thereof) can identify a crowd location upon or after the crowd begins to occupy a cell sector or more than one cell sectors in the partition.

In some embodiments, a backend network (or a system thereof) can query customer database storing respective device profiles associated with user devices. Therefore, in one example, the backend network (or the system thereof) can determine interests of subscribers respectively associated with the user devices based on individual device profiles of the user devices. In addition or in other embodiments, the backend network (or the system thereof) can associate a subscriber's interest with a local business or another type of organization in a cell sector in which the subscriber may be present. Further or in other embodiments, the backend network (or the system thereof) can generate a transaction opportunity (such as a commerce opportunity or an opportunity to exchange some information) for the local business or the organization entity in the cell sector based on interests associated with a user device. Furthermore or in yet other embodiments, the backend network (or the system thereof) can alert or otherwise communicate with the local business or the organization in the cell sector regarding the transaction opportunity. In addition or in the alternative, the backend network (or the system thereof) can notify availability of a commerce asset and/or can deliver information indicative or otherwise representative of a commerce asset (e.g., an offer for a product or a service) to a client device (e.g., a user device) having the module(s) of this disclosure and/or being designated to receive such a notification and/or information. In some embodiments, the backend network (or the system thereof) can perform (e.g., initiate and/or complete) or otherwise facilitate a commerce transaction or another type of transaction with a user device leveraging the ecommerce application. In addition or in the alternative, the backend network (or the system thereof) can share revenue with the local business or organization in the cell sector regarding the commerce transaction.

While various aspects of the disclosure are illustrated in connection with user equipment, such as a smartphone or a tablet computer, the disclosure is not limited in that respect and features of the disclosure can be implemented in any mobile device, such as a wearable device (e.g., a watch, a medical device), an infotainment vehicular system, a vehicular access point (AP) device, a navigation mobile device, a gaming mobile console, or the like. In addition, embodiments of the disclosure are not limited to a specific technology or network for wireless communication. Embodiments of the disclosure can be implemented in substantially any or any wireless communication network (second-generation (2G) network, third-generation (3G) network, or fourth-generation (4G) network, and variants thereof) and non-wireless communication network (broadband network, a cable network, a conventional Public Switched Telephone Network (PSTN), etc.). In addition, such aspects, features, or advantages can be realized irrespective of telecommunication radio technology or wireline technology. Examples of such radio technologies or wireless networks include Femtocell technology, Wi-Fi, Worldwide Interoperability for Microwave Access (WiMAX); Enhanced General Packet Radio Service (Enhanced GPRS); Third Generation Partnership Project (3GPP) Long Term Evolution (LTE); 3GPP Universal Mobile Telecommunications System (UMTS); Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); Global System for Mobile Communication (GSM) Enhanced Data Rate for GSM Evolution (EDGE) RAN or GERAN; UMTS Terrestrial Radio Access Network (UTRAN); or LTE Advanced. Examples of wireline technology include fiber-optic backbone networks, digital subscriber line (DSL) networks, T1/E1-based networks, Ethernet backbone networks, etc. Embodiments or related aspects also can be advantageously implemented in legacy telecommunication technologies.

With reference to the drawings, FIG. 1 illustrates an example of an operational environment 100 for determination of a location of a mobile device in accordance with one or more embodiments of the disclosure. The operational environment 100 can rely, for example, on exchange of communication messages or other types of communications between different devices and/or components in order to generate an estimate of a current location of mobile device in response to at least one of the messages. As illustrated, a location requestor device 110 can send a location request 112 to a location monitoring system 120. The location requestor device 110 can be associated with a platform architecture or network (represented with a "Network A" label in FIG. 1) having a specific functionality and/or configured to provide specific services. In some embodiments, the location requestor device 110 can be deployed (e.g., installed, configured, and accepted) at a platform for electronic commerce. In other embodiments, the location requestor device 110 can be deployed at a platform or network for law enforcement. The location monitoring system 120 can be deployed in another platform architecture or network (represented with a "Network B" label in FIG. 1) different from that in which the location requestor device 110 is deployed. Communications links 115 that can communicatively couple the location requestor device 110 and the location monitoring system 120 can permit transmission of the location request 112. The communication links 115 can be embodied in or can include wireless links (e.g., deep-space wireless links and/or terrestrial wireless links); wireline links (e.g., optic-fiber lines, coaxial cables, and/or twisted-pair lines); routers; switches; server devices; aggregator devices; a combination of the foregoing; or the like.

Figure 2:
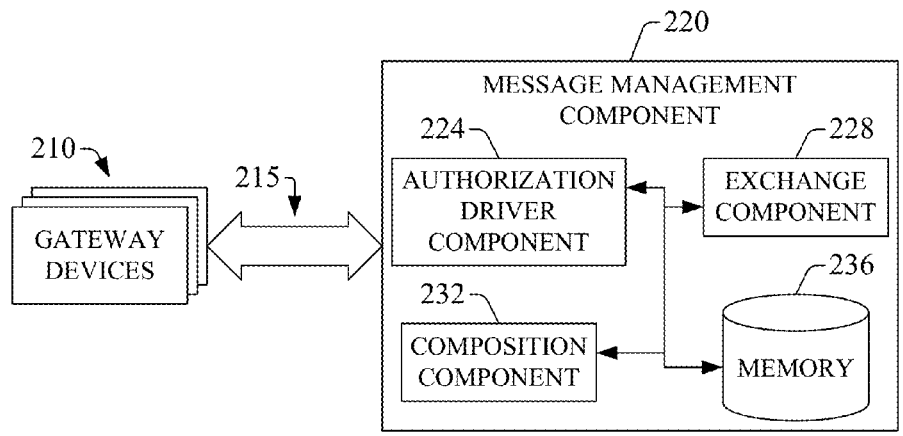
FIG. 2 presents an example of a communication component for determination of a location of a mobile device in accordance with one or more embodiments of the disclosure.

In some embodiments, the location request 112 can be embodied in or can include a short message service (SMS) message or another type of communication message directed to a mobile device 160. Suitable types of communication messages include, for example, a multimedia messaging service (MMS) message, a session initiation protocol (SIP) message, an unstructured supplementary service data (USDD) message, an email message, or the like. As such, the communication request 112 can be addressed to a defined communication address of the mobile device 160—e.g., a telephone number, an international mobile subscriber identity (IMSI), an internet protocol (IP) address, a media access control (MAC) address, a session initiation protocol (SIP) address, or the like. The location monitoring system 120 can receive the location request 112 and can utilize or otherwise leverage the communication address to process the location request 112. Specifically, in some embodiments, the location monitoring system 120 includes communication components 124, at least one of such components can receive the location request 112. A location component that receives the location request 112 can be configured to receive a communication according to a communication protocol that the location requestor device 110 relies on to send the location request 112. The communication protocol can be embodied in or can include short message peer-to-peer (SMPP) protocol, simple mail transport protocol (SMTP), hypertext transfer protocol (HTTP), internet protocol (IP), internet control message protocol (ICMP), mobile application part (MAP) protocol, or the like. As such, in one example, the location component that receives the location request 112 can be embodied in or can constitute a web-based gateway device. In another example, such a location component can be embodied in or can constitute a mobile switching center (MSC) device. More generally, in at least some embodiments, such as the example embodiment shown in FIG. 2, the communication components 124 can include gateway devices 210 communicatively coupled to a message management component 220 via communication links 215. The communication links 215 can include wireless link(s), wireline link(s), and/or reference link(s). A first gateway device of the gateway devices 210 can receive a communication message from a device external to the location monitoring system 120, and the message management component 220 can process the communication message and/or can deliver it to a second gateway device of the gateway devices 210. The message management component 220 also can send the communication message to a component within the location monitoring system 120. The second gateway device can send the originally received message or a different message to another device external to the location monitoring system 120.

With further reference to FIG. 1, the location monitoring system 120 can include a location access component 128 that can determine if the location request 112 is to be fulfilled. Specifically, the location access component 128 can determine if location information associated with the mobile device 160 (e.g., a smartphone or a tablet computer) can be provided to the location requestor device 110 in response to the location request 112. To that end, in some embodiments, the location access component 128 can receive an instruction or another type of signaling to perform such a determination from a communication component of the communication components 124. For instance, in one embodiment, such as the embodiment shown in FIG. 2, the communication component that sends the instruction or other signaling can be embodied in the message management component 220, in which component an authorization driver component 224 can send the instruction or the signaling. In response to such an instruction or signaling, the location access component 128 can access authorization information related to tracking location of the mobile device 160, and can utilize the access authorization information to ascertain that location of the mobile device 160 can be tracked or that such a location cannot be tracked. In a scenario in which the location of the mobile device 160 can be tracked, the location request 112 can be fulfilled. The access authorization information can be included in a profile of mobile device 160. The profile can be retained or otherwise recorded in one or more computer-accessible memory elements 142 (referred to as profile(s) 142) within a network repository 140. The profile(s) 142 can embody or can constitute, in one example, a database (relational or unstructured, for example) within a home subscriber server (HSS) device or a home location register (HLR) device. In one implementation, the network repository 140 can be embodied in or can include distributed computer-accessible information storage apparatuses, such as a consolidated network repository (CNR), which is one implementation of cloud storage.

Figure 3:
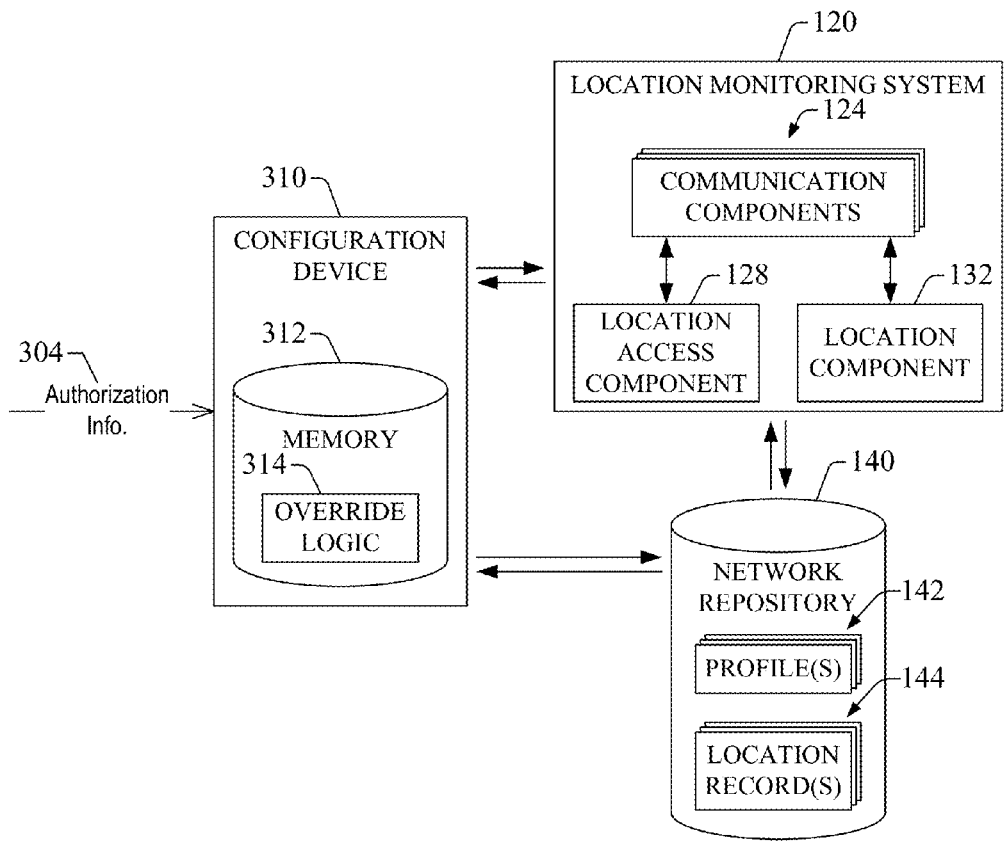
FIG. 3 presents an example of a system for determination of a location of a mobile device in accordance with one or more embodiments of the disclosure.

In one scenario, access authorization information that is acquired by the location access component 128 can include opt-out information (e.g., data or metadata) that specifies that tracking location of the mobile device 160 is not permitted. In response, the location access component 128 can determine that location information associated with the mobile device 160 is not to be provided in response to the location request 112. In addition or in other scenarios, the location access component 128 can implement an exception handling process, which can result in rejection of the location request 112. The exception handling process can be specific to the type of location requestor device 110. For instance the exception handling process implemented for user equipment can be different from the exception handling process implemented for customer premises equipment or to a network device. In some implementations, depending on the location requestor device 110, implementation of the exception handling can have additional or alternative outcomes besides rejection of the location request 112. Specifically, in some embodiments, such as the example embodiment shown in FIG. 3, implementation of the exception handling cause a configuration device 310 to override the opt-out information and modify the authorization information present in the device profile associated with the mobile device 160. To such an end, in one example, the configuration device 310 can be communicatively coupled to the location access component 128 and can execute override logic retained in a memory element 314 (referred to as override logic 314) within one or more computer-accessible storage devices 312 (referred to as memory 312). More specifically, in response to the opt-out information or absence of permission to track location of the mobile device 160, the configuration component 310 can receive, from the location access component 128, signaling or another type of directive to execute the override logic. Execution of the override logic can cause the configuration device 310, or a component therein or functionally coupled thereto, to modify the profile associated with the mobile device 160 to include opt-in information (e.g., data or metadata) indicative or otherwise representative of permission to track the location of the mobile device 160. In addition, the implementation of the exception handling process can cause the location access component to retry accessing the authorization information, which after the modification performed by the configuration component 310, can result in the location access component 128 accessing such opt-in information. The override of authorization information can be implemented in emergency scenarios in which availability of an estimate of the current location of the mobile device 160 can be critical to the integrity of the mobile device 160 or a person that may be carrying the mobile device 160.

Addition or other outcomes of an exception handling process implemented by the location access component 128 can include communication with an agent device of a service provider that provide wireless service or other types of services to the mobile device 160. The communication can convey to the agent device that tracking of the location of the mobile device 160 is not permitted. In response, the agent device (not shown) can send authorization information 314 to the configuration device 310, where the authorization information can include opt-in information. The configuration device 310 can utilize or otherwise leverage the authorization information 314 to modify a device profile of the mobile device 160 in order to permit tracking of the location of the mobile device 160. In some scenarios, the agent device can send the authorization information 314 on-demand, in response to a request from a device associated with the mobile device 160. Such a device can be billed for the submission of the authorization information 314 and the re-configuration of the device profile of the mobile device 160.

With reference again to FIG. 1, in other scenarios, access authorization information that is acquired by the location access component 128 can include opt-in information that specifies that tracking location of the mobile device 160 is permitted. The opt-in information also can specify the scope of permission to track the location of the mobile device 160. For instance, the opt-in information can determine a period during which location of the mobile device 160 can be monitored, a group of devices permitted to monitor the location of the mobile device 160, conditions or events in response to which the location of the mobile device 160 can be tracked, a combination thereof, or the like. The group of devices can include, for example, a device associated with a platform for electronic commerce, a device associated with a platform for law enforcement, a user equipment associated with the mobile device 160, and the like. A configuration component (not shown in FIG. 1) can permit configuring the opt-in information to specify tracking period, a device to be included in the group of devices, one of such conditions or events, a combination thereof, or the like. For instance, the configuration component can receive a telephone number or another communication address (e.g., a MAC address) of a user equipment that can be permitted to track the location of the mobile device 160. The configuration component can be embodied in, for example, the configuration device 310 shown in FIG. 3, and a communication address of user equipment permitted to track the location of the mobile device 160 can be received via authorization information 314.

In response to opt-in information, the location access component 128 determines that location information associated with the mobile device 160 can be provided in response to the location request 112. Therefore, the location access component 128 can signal or otherwise indicate to a communication component of the communication components 124 that an estimate of the current location of the mobile device 160 is to be determined. To that end, in some embodiments, the location access component 128 can direct or otherwise cause the communication component to send a location update trigger 134 to the mobile device 160. The location update trigger 134 can cause the mobile device 160 to perform a location update, which can result in generation of location information representative or otherwise indicative of a current location of the mobile device 160. In response to the location update, the mobile device 160 can send at least a portion of such information. As an example, the communication component can be embodied in or can include the message management component 220 shown in FIG. 2, which can include a composition component 232 that can generate the location update trigger 134. In such an embodiment, prior to generation of the location update trigger 134, the authorization driver component 224 can receive the indication that the estimate of the current location of the mobile device 160 is to be determined. In some embodiments, the second message can be embodied in a control message within a standardized protocol for generation of a location update of the mobile device, such a location area update (LAU) in UMTS or a location determination procedure in E-911. The location update trigger 134 can be embodied in or can include, for example, a communication message directed to the mobile device 160, such as a SMS message, an MMS message, a SIP message, a USDD message, an email message, or the like. It is noted that, in one implementation, the location update trigger 134 can coincide with the location request 112. Thus, the composition component 232 can replicate the location request 112 and can assign the replicated location request 112 as the location update trigger 134. In the alternative, in such an implementation, the message management component 220 can circumvent the composition component 232, and can send the location request 112 as the location update trigger 134.

Figure 4:
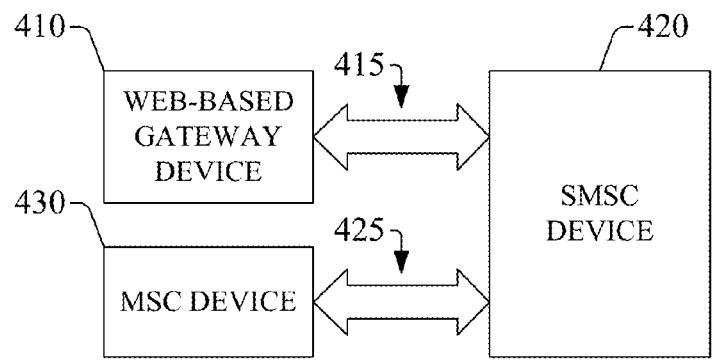
FIG. 4 presents another example of a communication component for determination of a location of a mobile device in accordance with one or more embodiments of the disclosure.

The communication component that can send the location update trigger 134 (e.g., the message management component 220 shown in FIG. 2) can leverage another communication component of the communication components 124 to route the location update trigger 134 to a network device within an access network 150 that is communication with the mobile device 160. The network device (not depicted in FIG. 1) can be embodied in a base station or an access point device, and can send the location update trigger 134 to the mobile device 160 via a downstream link (DL) of wireless links 155. As an illustration, in some embodiments, such as the embodiment shown in FIG. 2, a delivery component 228 within the message management component 220 can access routing information from the network repository 140 shown in FIG. 1. For instance, the routing component can be retained in a home location register (HLR; not depicted in FIG. 1). The routing information can permit determining a gateway device of the gateway devices 210 that is configured to send information to the network device. As another illustration, FIG. 4 presents an example embodiment of the communication devices 124 in accordance with at least some of aspects described herein. Specifically, the communication component that sends the location update trigger 134 can be embodied in or can constitute a short message service center (SMSC) device 420, and the communication component that routes the location update trigger 134 can be embodied in or can constitute a MSC device 430. In addition, a web-based gateway device 410 can receive the location request 112. In such an example embodiment, the location update trigger 134 can be or can include a SMS message. One or more communication links 415 can couple communicatively the web-based gateway device 410 and the SMSC device 420. Thus, the communication link(s) 415 can permit exchange of information (data, metadata, and/or signaling) between such devices. Similarly, one or more communication links 425 can couple communicatively the MSC device 430 and the SMSC device 420. Thus, the communication link(s) 425 can permit exchange of information (data, metadata, and/or signaling) between such devices.

Continuing with FIG. 1, the mobile device 160 can receive the location update trigger 134 and, in response, can generate location information indicative or otherwise representative of a current location of the mobile device 160. In some implementations, the mobile device 160 can process payload data received in the location update trigger 134, and for payload data including a defined keyword (e.g., "locate" or "position"), the mobile device 160 can generate the location information. The location information can be generated in numerous ways, depending on architecture of the mobile device 160 and/or communication signals available thereto. In a scenario in which the mobile device 160 includes a satellite-signal receiver, the mobile device 160 can utilize the satellite-signal receiver to access global positioning system (GPS) signals and/or signals from other GNSSs, such as BeiDou navigation satellite system (BDS), quasi-Zenith satellite system (QZSS), and/or GPS aided geo augmented navigation (GAGAN) system. A processor and/or dedicated hardware in the mobile device 160 can process the GPS signals or signals from another GNNS in order to generate location information indicative of a current location of the mobile device 160. The location information represents an estimate of the current location of the mobile device 160. In the alternative, the mobile device 160 can send the GPS signals or the signals from another GNNS to the location component 132, which can determine an estimate of the current location of the mobile device 160. In such a scenario, the location information generated by the mobile device 160 is embodied in the satellite-based signals accessed by the mobile device 160.

In some instances in which signals from a GNNS have poor quality (e.g., environment causes significant scattering) or are received from a subset of the satellites in the GNNS, the mobile device 160 can receive assistance information from the location component 132. The assistance information can be indicative or otherwise representative of position of one or more satellites of the GNNS (e.g., almanac and/or ephemeris data) and/or reference time. The mobile device 160 can process the assistance information in order to generate location information indicative of a current location of the mobile device 160.

Regardless of the specific type of location information generated at the mobile device 160, the mobile device 160 can send location information 136 indicative or otherwise representative of the current location of the mobile device 160 to the location component 132. Specifically, in one implementation, the location information 136 can be sent wirelessly, via an upstream link (UL) of the wireless links 155, to a network device (e.g., a base station, an access point device, or a location measurement unit (LMU)) of the access network 150. In some embodiments, the access network 150 can be embodied in a radio access network (RAN) that operates in accordance with one or more radio technology protocols for wireless communication. The network device can send the information 136 to a first communication component (e.g., a MSC device) of the communication components 124, which in turn can send the location information 136 to a second communication component (e.g., SMSC device) of the communication components 124. The second communication component can send the location information 136 to the location component 132. In one embodiment, such as the example embodiment shown in FIG. 2, the exchange component 228 can receive the location information 136 and can relay the received information to the location component 132.

In other instances in which signals from a GNNS are unavailable or in embodiments in which the mobile device 160 lacks a satellite-signal receiver, the mobile device 160 can utilize or otherwise leverage a transceiver configured to transmit and receive terrestrial radiofrequency signals in order to generate location information. Accordingly, in one implementation, in response to the location update trigger 134, the mobile device 160 can send pilot signals to a group of network devices (e.g., multiple base stations or AP devices, or multiple LMUs) of the access network 150. The access network can determine timing information indicative of the time of arrival of the pilot signals at each of the group of network devices, and can send such information to the location component 132. In response, the location component 132 can determine, for example, a time difference of arrival (TDOA) for each pair of the group of network devices, and can implement a multilateration process in order to determine an estimate of a current location of the user equipment. In other implementations, the mobile device 160 and the location component 132 can implement or otherwise utilize an advanced forward link trilateration (AFLT) process in order to generate an estimate of the current location of the mobile device 160. Thus, the mobile device 160 can probe (e.g., receive and analyze) pilot signals from the group of network devices, which can result in timing information and/or distance information indicative or otherwise representative of a distance from a network device (e.g., a base station) to the mobile device 160. The timing information and/or the distance information can embody or can constitute the location information 136, and the mobile device 160 can send such information to the location component 132. In response, the location component 132 can perform or otherwise utilize a trilateration process based at least a portion of the location information 136 in order to generate the estimate of the current location of the mobile device 160.

As described herein, the location component 132 can receive location information 136 from the mobile device 160 and can determine an estimate of the current location of the mobile device 160 using the location information 136. Such an estimate can be formatted geographic coordinate format (e.g., latitude, longitude, and/or altitude) or in civic address format (e.g., civic number, street name, and ZIP code). In embodiments in which the mobile device 160 can receive signals from a GNNS, the location information 136 can embody or can constitute the estimate of the current location of the mobile device 160. As such, the location component 132 can assign the received location information 136 to a record indicative of the estimate of the current location of the mobile device 160. Such a record can be retained at the network repository 140, within one or more memory elements 144 (referred to as location record(s) 144). In embodiments in which satellite signals are unavailable or the mobile device 160 lacks a satellite-signal receiver, the location component 132 can process at least a portion of location information 136 in order to generate the estimate of the current location of the mobile device 160. More specifically, in some implementations, the location component 132 can implement multilateration (e.g., TDOA multilateration or AFLT) to determine such an estimate.

Figure 5:
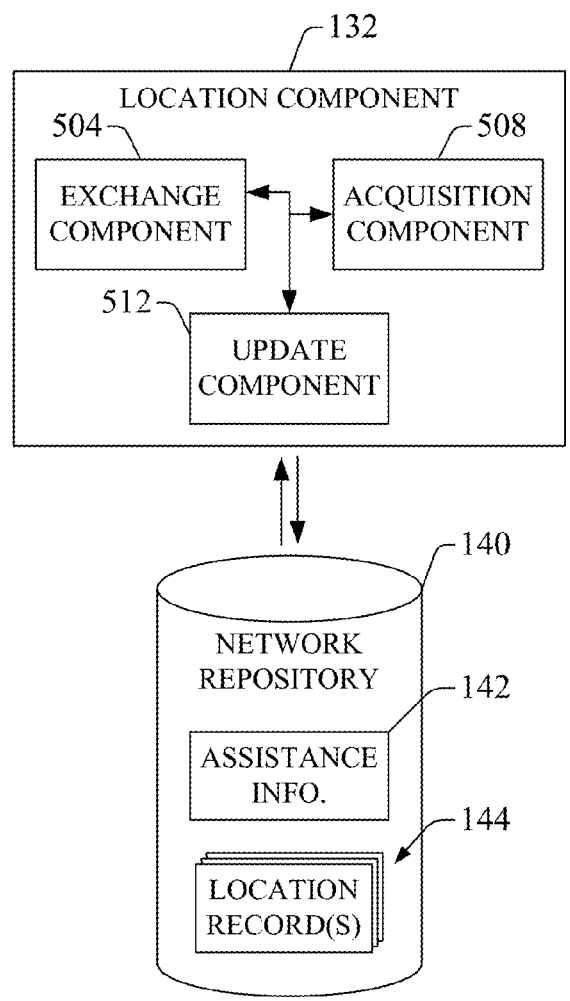
FIGS. 5-6 present an example of a location component for determination of a location of a mobile device in accordance with one or more embodiments of the disclosure.

As an illustration, an example embodiment of the location component 132 is shown in FIG. 5. An exchange component 504 can receive and send information (e.g., data, metadata, and/or signaling) to a communication device (e.g., message management component 220). The information can include, for example, an instruction or another type of directive to determine the estimate of the current location of the mobile device 160, as described herein. In scenarios in which the mobile device 160 can generate location information indicative of such an estimate, the exchange component 504 can receive the location information (e.g., location information 136) and can provide the information to an update component 512 that retain the estimate of the current location of the mobile device 160 within the location record(s) 144. In one implementation, the location record(s) 144 can be embodied in or can constitute an automatic location information (ALI) database. As illustrated in FIG. 5, the location component 132 can include an acquisition component 508 that can send assistance information to the mobile device 160, as described herein. Assistance information can be retained a memory element 142 (referred to as assistance info. 142) within the network repository 140. Assistance information also can be retained in one or more computer-accessible memory devices within the location component 132. In addition, the acquisition component 508 can generate the estimate of the current location of the mobile device 160 in scenarios in which GNNS signals are unavailable to the mobile device 160, as described herein.

Figure 6:
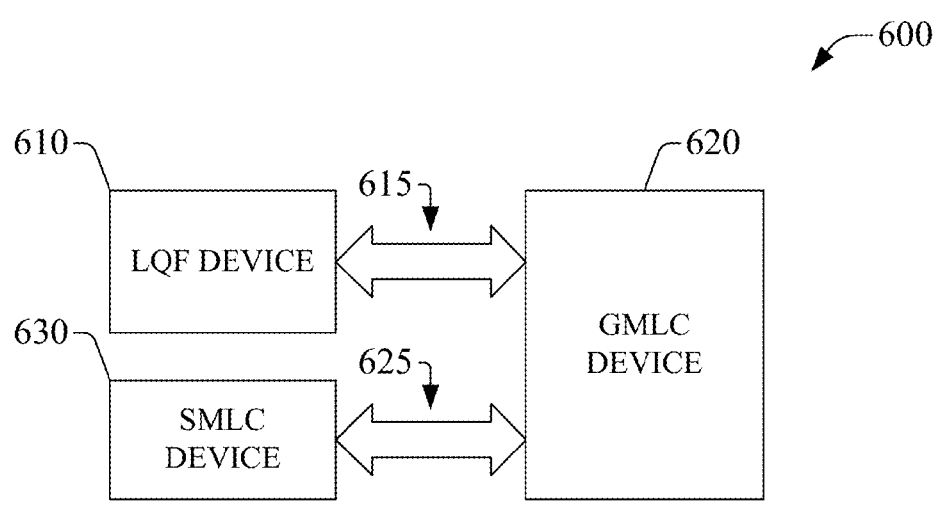

As another illustration, a distributed embodiment of location component 132 is shown in FIG. 6. The location component 132 can include a location query function (LQF) device that can receive an instruction to determine a current estimate of the location of the mobile device 160. The LQF device 610 can cause a communication component (e.g., a SMSC device) to send the location update trigger 134 (e.g., SMS message) to the mobile device 132. As described herein, the location update trigger 134 can cause the mobile device 160 to perform a location update. Therefore, in one implementation, the mobile device 160 can exchange information with a serving mobile location center (SMLC) device 630 in order to generate location information representative of the current location of the mobile device 160, as described herein. The SMLC device 630 can send the location information to a gateway mobile location center (GMLC) device 620, which can update a location record (e.g., one of the location record(s) 144) associated with the mobile device 160. One or more communication links 625 can permit exchange of information between the GMLC device 620 and the SMLC device 630. The LQF device 610 can access the updated location record and can send such a record to the location access component 128.

Regardless of the specific embodiment of the location component 132, upon or after an estimate of the current location of the mobile device 160 becomes available in response to the location update trigger 134 (e.g., a SMS message or control information), the location component 132 can send the estimate to the location requestor device 110. To that end, in one implementation, the location component 132 can send the estimate of the current location of the mobile device 160 to a first communication component of the communication components 124. The first communication component (e.g., a SMSC device) can compose a communication message including the estimate of the current location of the mobile device 160. More specifically, as an illustration, in an embodiment in which the first communication component is embodied in or includes the message management component 220 shown in FIG. 2, the exchange component 228 can receive the estimate of the current location of the mobile device 160. The exchange component 228 can provide the estimate to the composition component 232, which can compose the communication message. The communication message can be referred to as current location message 116, and is addressed or otherwise directed to a defined communication address of the location requestor device 110, such as a telephone number, an IP address, a MAC address, a SIP address, or the like. The current location message 116 can be embodied in or can include, for example, a SMS message, a MMS message, a SIP message, a USDD message, an email message, or the like. Accordingly, the current location message 116 can be composed according to a defined communication protocol can be embodied in or can include SMPP protocol, SMTP, HTTP, IP, ICMP, MAP, or the like. In addition, the current location message 116 can include a hyperlink associated with geographic coordinates indicative of the estimate of the current location of the mobile device 160. The hyperlink can be configured to be executed by a web application (e.g., a HTTP application or a MAP application) at the location requestor device.

It is noted that the first communication component that composes the current location message 116 can be the same communication component (e.g., message management component 220) that can generate and/or route the location update trigger 134. In addition, the first communication component can send the current location message 116 to a second communication component of the communication components 124. The second communication component (e.g., a MSC device) can send the current location message 116 to the location requestor device 110. It is noted that the second communication component (e.g., a web-based gateway device) can be the same communication component that can receive the location request 112. In some instances, with further reference to FIG. 2 as an illustration, the second communication component can be embodied in or can include a gateway device of the gateway devices 210.

The location requestor device 110 in the operational environment 100 can receive the current location message 116 and, thus, the location request 112 can be fulfilled. It is noted that the location request 112 can be fulfilled without reliance on dedicated location service software (e.g., a specialty software application) being configured and/or executed in the mobile device 160. Instead, as described herein, the location request 112 can be fulfilled by validating a preconfigured permission to track the location of the mobile device 160, and exchanging suitable messages between the location requestor device 110, the location monitoring system 120, and the mobile device 160. It should further be appreciated that the location request 112 can be fulfilled without intervention of an end-user associated with the mobile device 160, such as configuring a location tracking preference at the mobile device 160 within a specialty software application, or selecting a generic location based service at the mobile device 160. By fulfilling the location request 112, the location monitoring system 120 can permit, for example, tracking the location of the mobile device 160 in response to certain events, such as the mobile device 160 being stolen or lost, an end-user known to carry the mobile device 160 being missing, or occurrence of natural disaster or other type of emergency (e.g., riots or a terrorist attack) in an area in which the mobile device 160 is known to be operating.

The location requestor device 110 can implement various processes based on the availability of the location request 112. For example, in an embodiment in which the location requestor device 110 is embodied in a device associated with a platform for electronic commerce, the device can provide an estimate of the current location of the mobile device 160 to affiliate devices associated with affiliate platforms for electronic commerce. In addition or in the alternative, the device can supply various types of promotional content to the mobile device 160 based on the estimate of the current location of the mobile device.

Figure 7:
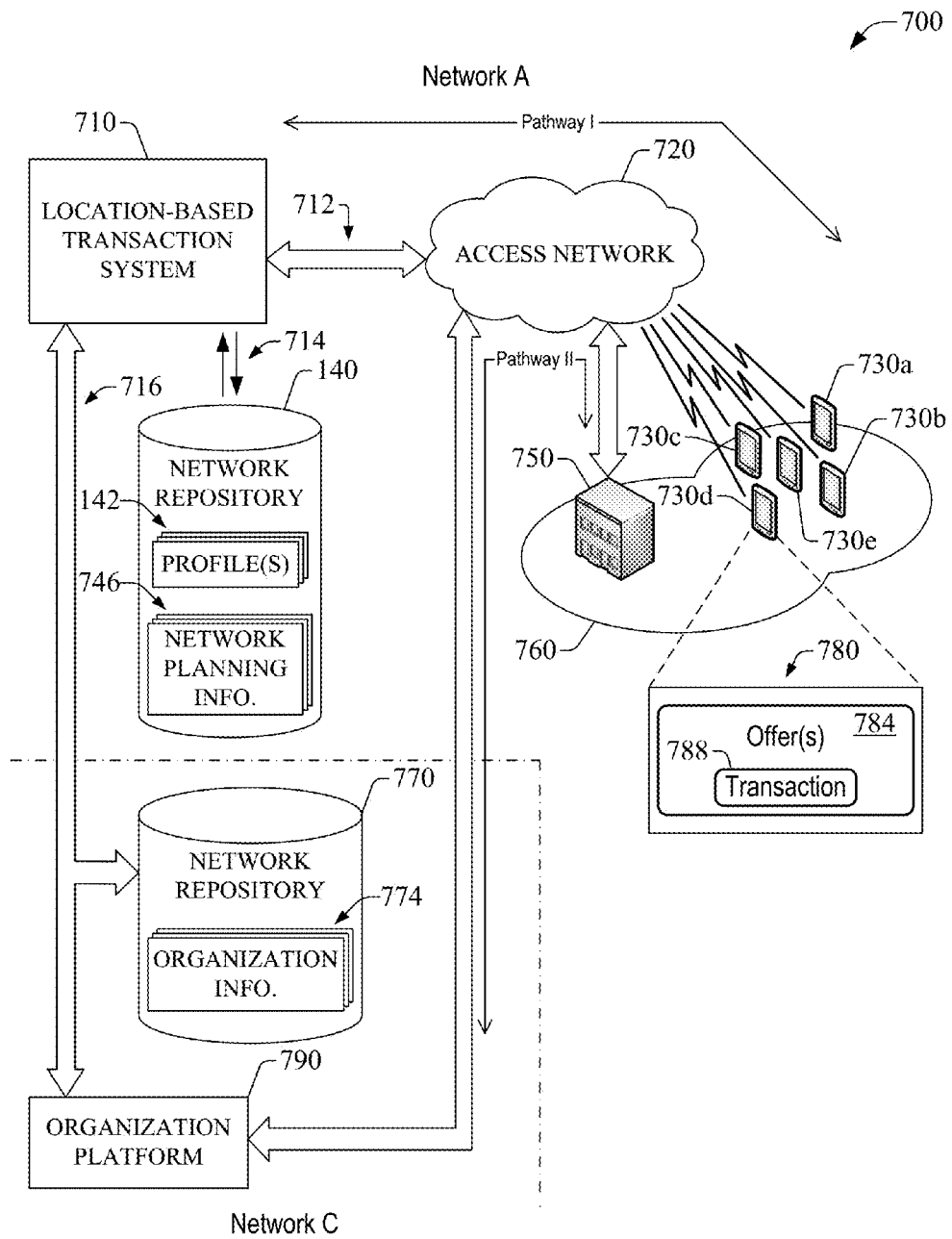
FIG. 7 presents an example of an operational environment for crowd-location based transactions in accordance with one or more embodiments of the disclosure.

FIG. 7 presents an example of an operational environment 700 for crowd-location based transactions in accordance with one or more embodiments of the disclosure. The operational environment 700 includes a location-based transaction system 710 that can be functionally coupled (e.g., communicatively coupled, electrically coupled, and/or electromechanically coupled) to network repositories including a variety of information. As described herein, the network repositories can include computer-accessible storage devices and can be configured or otherwise deployed in one or more networks, such as a communication network, and MSO network, a network for electronic commerce, a network for law enforcement, or the like. The network repositories can include a network repository 740 associated with (deployed at, maintained by, etc.) a first network (represented with "Network A"). Communication links 714 can permit or otherwise facilitate the exchange of information (e.g., data, metadata, and/or signaling) between the location-based transaction system 710 and the network 740. The communication links 714 can include an upstream link (or uplink) and/or a downstream link (or downlink), and can be embodied in or can include wireless link(s); wireline link(s); reference links; other type of devices, such as a gateway device, a router device, an aggregator device; a combination of the foregoing, or the like. Wireless links can include deep-space wireless links and/or terrestrial wireless links (e.g., a cellular wireless link, a confined-access wireless link (such as a Wi-Fi or a femtocell wireless link), a combination thereof, or the like). Wireline links can include optic-fiber lines, coaxial cables, and/or twisted-pair lines.

The first network (e.g., Network A) can be embodied in or can include a communication network that can provide wireless communication service, wireline communication service, and/or other services. As such, in one example, the network repository 740 can include profiles associated with respective user devices. The profiles (or information indicative thereof) can be retained or otherwise recorded in one or more computer-accessible memory elements 142 (referred to as profile(s) 142) within a network repository 140. The profile(s) 142 can embody or can constitute, in one example, a database (relational or unstructured, for example) within a home subscriber server (HSS) device or a home location register (HLR) device. In addition or in other embodiments, the network repository 140 can include network planning information indicative or otherwise representative of a cell plan of cell sectors in a region of service coverage (e.g., wireless service coverage) of the first network. The network configuration information can be retained or otherwise recorded in one or more computer-accessible memory elements 746 (referred to as network planning info. 746) within the network repository 140. In some implementations, the network repository 140 can be embodied in or can include distributed computer-accessible information storage apparatuses, such as a consolidated network repository (CNR), which is one implementation of cloud storage. While not shown in FIG. 7, the network repository 140 also can include profile(s) 142 and/or location record(s) 144, as described herein.

The network repositories that can be functionally coupled to the location-based transaction system 710 also can include a network repository 770, which can be associated with a second network (represented with "Network B"). The location-based transaction system 710 can exchange information with the network repository 770 via communications links 716 and other communication components (e.g., gateway devices, router devices, a combination thereof, or the like; not depicted in FIG. 7). It is noted that, in some embodiments, the communication links 716 can be structurally and/or functionally different from the communication links 714. The communication links 716 can include wireless link(s), wireline link(s) and/or reference link(s). The network repository 770 can include organization information indicative or otherwise representative of a commercial organization (e.g., a small or medium business) that can provide goods or services. Similar to other information disclosed herein, the organization information can be retained or otherwise recorded in one or more computer-accessible memory elements 774 (referred to as organization info. 774). The goods can include consumer goods, industrial goods (automotive goods, construction goods, automation control goods, etc.), or the like. The consumer goods can include foodstuffs, beverages, sports apparel, and the like. The services can include consumer services (e.g., healthcare, fitness and wellness, or the like), business services, or industrial services. The organization information can include location information indicative of a location (e.g., a physical address) of a business entity associated with the commercial organization. The business entity can be specific to the commercial organization. For example, in an instance in which the commercial organization provides fitness and wellness services, the business entity can be embodied in or can include a facility or a confined space in which such services can be provided. For another example, in an instance in which the commercial organization provides beverages (infused or otherwise) and/or foodstuffs, the business entity can be embodied in or can include a facility or a confined space in which the beverages and/or foodstuffs are provided.

A device of an organization platform 790 can send (e.g., push) or otherwise provide at least a portion of the organization info. 774. In one example, the organization platform 790 can be associated with a commercial organization related to the provided organization info. 774. In another example, the organization platform 790 can be associated with a non-commercial organization (e.g., a not-for-profit organization) related to the provided organization info. 774. To that end, in one embodiment, the device can utilize or otherwise leverage a communication link of the communication links 716.

The location-based transaction system 710 can access or otherwise receive at least a portion of the organization information 774 and at least a portion of the networking planning information 746. Using at least the accessed information, the location-based transaction system 710 can identify an identity and/or a location of a business entity that is present within a cell sector. In some implementations, the location-based transaction system 710 can identify identities and/or locations of some or all business entities present in a cell sector (or a cell, in case of a region served by a base station device having an omnidirectional antenna). To at least such ends, in some embodiments, the location-based transaction system 710 or a component thereof can partition a map of a geographic area according to cell sectors and/or cells based on a cell plan associated with wireless service coverage provided by the first network (e.g., Network A). In addition, the location-based transaction system 710 can map or otherwise associate location information indicative or otherwise representative of a location of a business entity (e.g., a store in a restaurant chain or a gym facility in a fitness center franchise) of a commercial organization to a cell sector in the cell plan. In one example, the location-based transaction system 710 can generate a list of pairs, each including location and cell sector identifier. Specifically, in one example, the location can be represented with an address or geographic coordinates, and the cell identifier can be embodied in or can include a GSM Cell ID (CID) or a UTRAN LCID. As an illustration, as shown in the example embodiment in FIG. 8, the location-based transaction system 710 can include a business entity identification component 810 that can access (e.g., query or otherwise receive) a portion of the network planning information 746 and a portion of the organization information 774. To that end, the business entity identification component 810 can utilize at least one of the communication components 850 to send (e.g., transmit or otherwise communicate) a query or another type of request for information to the network repository 140 or a component thereof (e.g., a database manager device). The at least one of the communication components 850 can receive the information, and can relay it to the business entity identification component 810. Based on the accessed information, the business entity identification component 810 can determine an identity and/or location information of a business entity (e.g., coffee shop, a movie theater, a sports apparel store, or the like) of a commercial organization. In addition, also based on the accessed information 746, the business entity identification component 810 can map the location information—which can be indicative or otherwise representative of the location of the business entity—to a cell sector or a cell, as described herein.

With further reference to FIG. 7, the location-based transaction system 710 can generate and maintain records of the business entities identified to be present within a cell sector or a cell. The location-based transaction system 710 can update such records continuously, semi-continuously, periodically, according to a schedule of specific times, or in response to certain events. As such, in some implementations, the location-based transaction system 710 can continuously implement a process that identifies a business entity and maps it to a cell sector or a cell. In other implementations, the location-based transaction system 710 can implement such a process according to a schedule of times (periodic or non-periodic). In yet other implementations, the location-based transaction system 710 can identify an identity and/or a location (e.g., address) of a business entity and can map the business entity to a cell sector or cell in response to an event. More specifically, in one example, a device of the organization platform 790 associated with a commercial organization can update information associated with an identity and/or a location of a business entity within the network repository 770. In addition, the device can instruct or otherwise cause the location-based transaction system 710 to implement the process that identifies the business entity and maps it to a cell sector or cell. In response, the location-based transaction system 710 can implement such a process and can update (e.g., modify or generate) a business record associated with the business entity. Similarly, in another example, a network device (e.g., an operational support system (OSS) server device) of the first network (or "Network A") can update cell plan information in the network repository 740. In response, the location-based transaction system 710 can implement the process that identifies the business entity and maps it to a cell sector or cell, and can update a business record associated with the business entity. The update of the business record can include, for example, the modification or generation of the business record. As an illustration of the foregoing features, with reference to the example embodiment shown in FIG. 8, the location-based transaction system 710 can include a business entity identification component 810 that can retain a record of the association between the location of the business entity and the cell sector or cell. The record can be retained in one or more computer-accessible memory elements 864 (referred to as business entity record(s) 864) within one or more memory devices 860 (referred to as information storage 860). The business entity identification component 810 can update the business entity record(s) 864 continuously, nearly continuously, periodically, according to a schedule, in response to a specific event (such as an update to a cell plan of an access network that provides wireless service), or according to a certain combination of the foregoing.

The location-based transaction system 710 can monitor presence and/or location of one or more mobile devices in at least one of the cell sectors and/or in at least one cell that span a geographic region. To at least such an end, as further illustrated in FIG. 7, the location-based transaction system 710 can be operatively coupled (e.g., communicatively coupled, electrically coupled, and/or electromechanically coupled) to an access network 720. Specifically, communication links 712 can permit the exchange of information between network devices in an access network 720 and the location-based transaction system 710. As such, in one embodiment, the location-based transaction system 710 can request or otherwise obtain control information from a network device of the access network 720. The network device can be embodied in or can include, for example, a radio network controller (RNC) device, an OSS server device, a base station device, or the like. The control information can be indicative or otherwise representative of attachment of one or more mobile devices to a base station device that can serve a cell sector or a cell (in case the base station device has an omnipresent antenna). Accordingly, the control information can be indicative or otherwise indicative of a mobile device being registered with the base station device to receive wireless service. As such, the control information can be representative of the mobile device occupying the cell sector or the cell. As an illustration, in the operational environment 700 a mobile device 730a can enter a cell sector 760 and can register with a base station (not depicted) that can serve the cell sector 760. Control information associated with such registration (e.g., attachment) can be retained at a network device (e.g., a RNC device) of the access network 720, and can be provided to the location-based transaction system 710 in response to a request for the control information, for example. Based at least on such control information, the location-based transaction system 710 can determine that the occupation of the cell sector 760 is at least one. In the example embodiment shown in FIG. 8, the location-based transaction system 710 can include a crowd detection component 820 that can send a request (e.g., a query or a control message) to a network device having access to the control information described herein. To the end, the location-based transaction system 710 can utilize or otherwise leverage a communication component (e.g., a gateway device) of the communication components 850. In response to the request, the network device (e.g., a RNC device) can send the requested control information indicative or otherwise representative of attachment of the mobile device 730a to the base station device that can serve the cell sector 760. Using the received control information, the crowd identification component 820 can determine a number $N_{OCC}$ indicative of the number of devices that occupy the cell sector, as described herein.

It is noted that attachment of a mobile device (e.g., mobile device 730a) to a base station device that can serve a cell sector (e.g., cell sector 760) can be time dependent in view of handovers from the base station to another base station and/or other events that can terminate attachment to the base station. Thus, control information that is indicative or otherwise representative of attachment of the mobile device to the base station device and that is received by the location-based transaction system 710 can be indicative or otherwise representative of an attachment state of the mobile at a specific time. As such, in some embodiments, the location-based transaction system 710 can obtain (e.g., request and receive) the control information at different times and can generate presence information indicative or otherwise representative of the occupation of cell sector or a cell at a time of the different times. Such a time-dependent occupation is indicated by a number $N_{OCC}(t)$ that occupy the cell sector or cell at a time t (a real number). Generating the presence information at the different times can be referred to as monitoring the occupation of the cell sector. In the example embodiment shown in FIG. 8, the crowd identification component 820 can monitor the occupation of cell sectors or cells. Specifically, the crowd identification component 820 can send a request (e.g., a query or a control message) for the control information, and can generate the presence information associated with a cell sector or a cell based at least on the control information received in response to the request.

With further reference to FIG. 7, the location-based transaction system 710 can determine if a crowd of mobile devices is present in a cell sector or cell. A "crowd of mobile devices" refers to a set of mobile devices having defined a number of elements greater than a defined threshold and/or defined localization properties. To such an end, the location-based transaction system 710 can utilize or otherwise leverage $N_{OCC}(t)$ of a cell sector or cell in order to determine if a crowd of mobile devices is present. Specifically, in one implementation, the location-based transaction system 710 can compare $N_{OCC}(t')$ at a time t' (which is a real number) with an average occupation (N) (a natural number) of the cell sector or cell. The magnitude of <N> can be determined as an average of occupation of the cell sector or cell over a defined period $\Delta t$. The location-based transaction system 710 can determine that a crowd of mobile devices is present as a result of an outcome of the comparison indicating that the difference $N_{OCC}(t')-$<N> is greater than a defined value $\Delta N$ (a natural number). A platform or operator that deploys and/or manages the location-based transaction system 710 can configure $\Delta t$ and/or $\Delta N$. In addition or in another implementation, the location-based transaction system 710 can determine a rate of change of $N_{OCC}(t)$ with respect to time and can further determine that a crowd of mobile devices is present in the cell sector or cell when such a rate is greater than a defined threshold. Determining such a rate of change (e.g., computing a first derivative of $N_{OCC}(t)$ with respect to time) can permit determining the formation of the crowd of mobile devices, as the rate of change of the occupation of the cell sector or the cell can indicate the rate at which mobile devices populate the cell sector or cell. In an example scenario, a crowd of mobile devices can be formed in portion of a highway due to a traffic jam. As such, the occupation of a cell sector neighboring the portion of highway can increase rapidly regardless the number of mobile devices that occupy the cell sector or cell. Similarly, in another example scenario, occupation of a cell sector that provides includes a venue for cultural events and/or sports events can increase rapidly (e.g., large rate of change of $N_{OCC}(t)$ with respect to time) near a time of commencement of an event at the venue (e.g., a stadium, an arena, a park, or the like). As an illustration, in the example embodiment shown in FIG. 8, the location-based transaction system 710 can include one or more crowd presence and/or formation rules that can be retained in one or more memory elements 866 (referred to as crowd detection rules 866) in the information storage 860. The crowd rules 264 can include a rule that can specify a test to be applied to $N_{OCC}(t)$ in order to establish that a crowd is present in a cell sector or cell, or that the crowd is being formed. The test can include a mathematical operation (e.g., a difference, a derivative, or the like) and a relationship operator (e.g., greater than, less than, equal to, or the like). In addition the rule also can include a threshold with respect to which the outcome of the test can be compared. The crowd detection component 820 can apply or can facilitate application of the test to one or more values of $N_{OCC}$ at respective times.

Detection of a crowd of mobile devices in a cell sector or cell can itself provide a coarse estimate of the location of the crowd—e.g., the crowd is located within the cell sector (e.g., cell sector 760) or cell. Yet, although the crowd of mobile devices can be sizeable, e.g., the number of mobile devices in the crowd can be or the order of about 10 to about to 1000, the location of the crowd can be confined to a small portion of the cell sector or cell (e.g., a resort, a movie theater, a stadium, or the like). For example, a group of moviegoers can form a crowd of mobile devices having a number of devices in a range from about 10 to about 100 mobile devices. For another example, a group of attendees to a game of the NBA Finals can include a crowd of about 1000 to about 5000 mobile devices. Therefore, in some embodiments, location of mobile devices after detection of a crowd of mobile devices can be contemplated in order to determine business entities and/or non-business entities that can benefit or otherwise can be suitable for a transaction with a mobile device of the crowd of mobile devices. Specifically, the location-based transaction system 710 can utilize or otherwise leverage the location monitoring system 120 to determine an estimate of a current location of a mobile device in a crowd of mobile devices. As an illustration, in the example embodiment shown in FIG. 8, the crowd detection component 820 can embody or can constitute the location requestor device 110, and can send a message (e.g., location request 112) to the location monitoring system 120 to obtain or otherwise access an estimate of a current location of a mobile device. The message can be sent via one or more of the communication components 850, for example. As such, in some implementations, the crowd detection component 820 can send messages to the location monitoring system 120 to obtain or otherwise access respective estimates of current position of respective ones of mobile devices in a crowd of mobile devices, in accordance with aspects described herein. For instance, the crowd detection component 820 can send five messages to the location monitoring system 120 in order to access respective estimates of the current location of each of the mobile devices 730a-730d.

Figure 8:
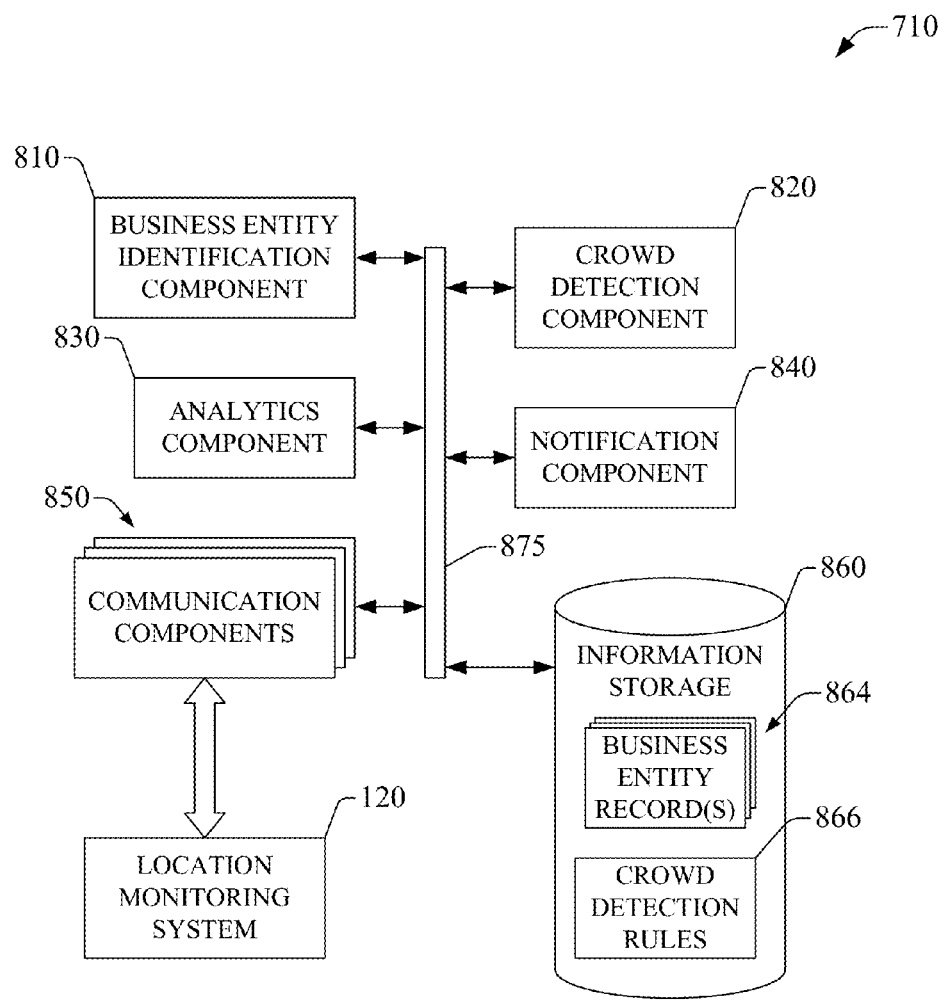
FIG. 8 presents an example of a location-based transaction system in accordance with one or more embodiments of the disclosure.

With further reference to FIG. 8, it is noted that, in some scenarios, the crowd detection component 820 can access or otherwise obtain an adequate estimate of the location of the crowd of mobile devices by accessing a current estimate of respective mobile devices in a subset of the crowd of mobile devices. Yet, in other scenarios, monitoring current location of a portion of mobile devices in the crowd of mobile devices can permit determining whether the crowd is localized around a single region or the crowd is formed by two or more other crowds of mobile devices. The current location of a mobile device in a crowd of mobile devices can be identified in several ways. In one example, the crowd detection component 820 can access location information associated with a mobile device from a network device that generates or permits generation of location information as part of network management (such as handover administration, management of traffic congestion, . . . ) or E-911 call management. In another example, the mobile device can register with the location-based transaction system 710 and/or the location monitoring system 120 to authorize the tracking of the location of the mobile device. Such a registration can result in an opt-in record being created at a device profile of the mobile device. Similarly, the mobile device may expressly opt-out from having its location tracked, at least in certain conditions, and an opt-out record can be created at the device profile to indicate the refusal of location tracking and/or the condition(s) under which the location of the mobile device can be tracked as described herein. In addition or in other scenarios, registration of the mobile device can include opt-in information indicative or otherwise representative of agreement to receive commerce assets in accordance with aspects of this disclosure. The identifying information can include a communication address, a password or other types of credentials, a combination thereof, or the like. The opt-in information can be included in the updated device profile of the mobile device can permit the location monitoring system 120 to determine such an estimate in accordance with aspects of this disclosure. In some implementations, such a registration can be performed concurrently or after the download of software application that permit or facilitates the consumption of commerce assets in accordance with aspects of this disclosure.

It should also be appreciated that in addition to detecting or otherwise monitoring the formation of the crowd of mobile devices, the location-based transaction system 710 can detect or otherwise monitor disintegration of such a crowd or a different crowd of mobile devices. As such, the location-based transaction system 710 can analyze location information indicative of current estimates of the location of respective mobile devices (e.g., mobile devices 730a-730d) in order to evaluate or otherwise determine one or more locations of a crowd of mobile devices, time dependence of a location of the crowd of mobile devices, and/or disintegration of the crowd of mobile devices. In one example, the location-based transaction system 710 can analyze a spatial distribution of estimates of location of mobile devices in the crowd of mobile devices, and thus, can determine (e.g., compute) metrics that can characterize the spatial structure of the crowd of mobile devices. For instance, the location-based transaction system 710 can determine a center position of the crowd of mobile devices, a spatial spread of the crowd of mobile devices (e.g., a second momentum of the distribution of estimates of location), a combination thereof, or the like. The metrics can be determined at different times after the crowd of mobile devices is detected.

Continuing with FIG. 7, as described herein, detection of a crowd of mobile devices can provide information that characterizes the crowd. More specifically, in some embodiments, the information can include location information indicative of representative of a location associated with the crowd; identification information indicative or otherwise representative of respective communication addresses of some or all of the mobile devices in the crowd; and/or estimates of a current location of at least one of the mobile devices in the crowd of the mobile devices. As described herein, the communication addresses can include a telephone number, an IMSI, an IP address, a MAC address, a SIP address, or the like. In some embodiments, the location-based transaction system 710 can access (e.g., query) the profile(s) 142 in order to access a device profile of a mobile device (the mobile device 730d, for example) of the crowd of mobile devices. Based at least on information on the device profile, the location-based transaction system 710 can determine or otherwise identify a commerce demand or commerce interest or the mobile device associated with the device profile. To that end, in one implementation, the location-based transaction system 710 can predict the commerce interest by using first information indicative or otherwise representative of demographics of an end-user associated with the mobile device; second information indicative or otherwise representative of services (e.g., voice, messaging, data, or the like) received from a wireless service provider or an affiliate thereof; third information indicative or otherwise representative of specialty application(s) available (e.g., downloaded to) the mobile device; a combination of the foregoing; or the like.

In addition or in another implementation, the location-based transaction system 710 can predict the commerce interest by using transactional information associated with the mobile device. The transactional information can be retained in one or more memory elements (not depicted) within the network repository 140. The transactional information can include, for example, information indicative or otherwise representative of monetary transactions between a network device associated with an organization and the mobile device associated with the device profile accessed by the location-based transaction system 710. The monetary transaction can be electronic and can include, for example, a purchase or a sale of a good or a service provided by an organization associated with the organization device; registration to participate in a professional meeting; or the like. In addition or as another example, the transactional information can include, for example, information representative of non-monetary transactions between a device and the network device. The non-monetary transactions can include, for example, printing of a coupon associated with the organization or download of coupon information (e.g., media and/or promotional information) representative of the coupon; consumption of an advertisement associated with the organization or selection (e.g., click, tap, swipe, or other type of actuation) of selectable indicia associated with the advertisement; consumption of promotional media (e.g., a video segment of an elite athlete endorsing a product) associated with the organization; electronic sharing (in social media or in a point-to-point communication, for example) of coupons or advertisements associated with the organization; enrollment in a loyalty program associated with the organization; application for a credit card (such as a store credit card) or other type of loan associated with the organization; a combination of the foregoing; or the like. It is noted that while monies (or an information representative thereof) may not be exchanged between the network device and the device or another device associated therewith (such as a credit-card processor device), an engagement in a non-monetary transaction can provide value to the device.

Figure 9:
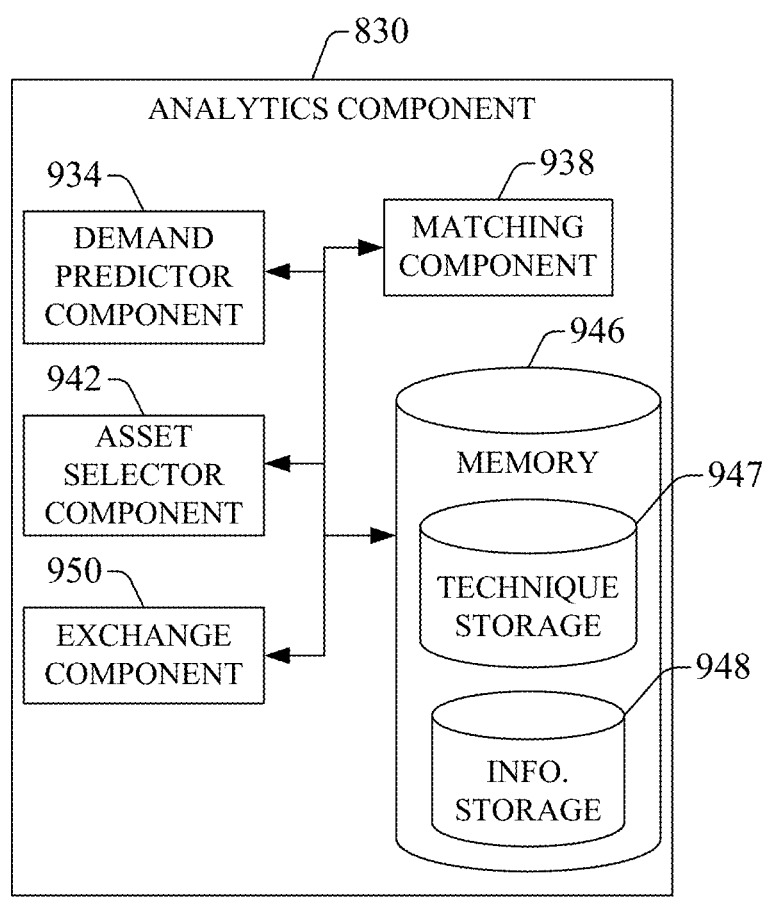
FIG. 9 presents an example of a component included in the location-based transaction systems in accordance with one or more embodiments of the disclosure.

Regardless of the specific information utilized or otherwise relied on by the location-based transaction system 710, commerce interests associated with respective mobile devices in a crowd of mobile devices can be predicted or otherwise determined. The location-based transaction system 710 can match or otherwise associate commerce interests to respective identities of respective ones of business entities within a cell sector or cell in which the crowd is present or being formed. To that end, the location-based transaction system 710 can identify or otherwise determine an identity of a business entity (e.g., business entity 750) within the cell sector or the cell that can provide a service and/or good that can satisfy a commerce interest of a mobile device in the crowd. In addition, the location-based transaction system 710 also can determine a distance between location of the business entity (e.g., a store of a chain of organic-food restaurants) and location of the crowd of mobile devices. The location of the crowd of mobile devices can be represented or otherwise indicated by a position in the cell sector or cell at which the density of mobile devices in the crowd is a maximum (local or global) or has a magnitude above a specific threshold, as described herein. The location-based transaction system 710 can then compare the distance to a threshold distance, and can configure the business entity as a matching business entity in response to the distance being equal to or less than the threshold distance. In addition or in other instances, other location selection criteria can be utilized besides the threshold distance can be utilized. For example, a location criterion can include a defined distance from a mass transit station. As an illustration, with reference to the example embodiment shown in FIG. 8, the location-based transaction system 710 can include an analytics component 830 that can predict a commerce interest of a mobile device and can match the commerce interest to a business entity, in accordance with aspects of the disclosure. Thus, in one embodiment, as shown in FIG. 9, the analytics component 830 can include a demand predictor component 934 that can access information from the profile(s) 142 and/or transactional information, and can determine a commerce interest and/or a commerce demand. In one example, the demand predictor component 934 can send a request for profile information (e.g., a query) to the network repository 140. The request can be sent via an exchange component 950 in accordance with a communication protocol for communication of digital information. The demand predictor component 934 can receive the information and can determine the commerce interest or the commerce demand.

In some embodiments, the demand predictor component 934 can predict the commerce interest and/or the commerce demand) by performing or otherwise facilitating artificial intelligence (AI) techniques to infer (e.g., reason and draw a conclusion based upon a set of metrics, arguments, or known outcomes in controlled scenarios) the commerce demand (or, in some embodiments, a commerce interest). In an aspect, the AI techniques can be retained in one or more elements 947 (referred to as technique storage 947). Artificial intelligence techniques can apply advanced mathematical algorithms—e.g., decision trees, neural networks, regression analysis, principal component analysis (PCA) for feature and pattern extraction, cluster analysis, genetic algorithm, or reinforced learning—to a data set; e.g., the collected subscriber intelligence in the case of subscriber segmentation. In particular, one of numerous methodologies can be employed for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation also can be utilized. In addition, linear classifiers, such as support vector machines (SVMs), non-linear classifiers like methods referred to as "neural network" methodologies, fuzzy logic methodologies also can be employed. One or more memory elements 948 (referred to as information storage 948) can include data and/or metadata that can be utilized for inferring the commerce interest and/or the commerce demand.

In addition, the demand predictor component 934 can send information indicative or otherwise representative of the commerce interest or the commerce demand to a matching component 938, which can apply the selection rule or criterion to such information. As a result, in one example, the matching component 938 can identify or otherwise determine a business entity that matches the commerce interest and satisfies a specific location criterion. Selection rules and/or location criteria utilized or otherwise leveraged to determine a business entity or another type of organization entity can be retained in the information storage 948.

The location-based transaction system 710 can request commerce assets from a business entity that matches a commerce interest of a mobile device in a crowd of mobile devices and resides within a defined distance from a location of crowd of mobile devices. Commerce assets can include, for example, advertisements or another type of promotional content; transaction deals or other types of offers; an award; a combination thereof, or the like. In scenarios in which an award is not included, the commerce asset may be referred to as a promotional asset. Transaction deals can include, for example, coupons, discounted membership to a service, trial membership to a service, and the like. Offers can include, for example, an offer for an amount of loyalty program points or other types of reward points. Awards can include, for example, a cash-back award, a free video game, a free character of a video game, access to locked content in a video game, a free song or specialty application, a combination thereof, or the like. The location-based transaction system 710 can select a commerce asset from the commerce assets based on various factors, such as time of day, commonalities between the mobiles devices in the crowd of mobile devices, demographics of the crowd of mobile devices, a combination thereof, or the like. As such, in one implementations, the location-based transaction system 710 can receive information indicative of the commerce assets, and can apply a selection rule or another type of criterion to the information in order to identify a commerce asset based on at least one of the foregoing factors. With further reference to the example embodiment shown in FIG. 8, the analytics component 830 can select the commerce asset as described herein. More specifically, in one example, such as the example embodiment shown in FIG. 3, the analytics component 830 can include an asset selector component 942 that can select commerce assets in accordance with aspects of this disclosure.

In the operational environment 700, the location-based transaction system 710 can send notification information indicative of a commerce asset available to a mobile device in a crowd of mobile devices. In addition or as an alternative, the location-based transaction system 710 can send the notification information to a server device or another type of device of an organization entity (e.g., business entity 750) located in the same cell sector or cell in which the mobile device is located. As illustrated, the location-based transaction system 710 can utilize or otherwise leverage a communication pathway I to send the notification information to the mobile device and another communication pathway to send the notification information to a device of the organization entity. The location-based transaction system 710 also can send information representative or otherwise indicative of the commerce asset itself besides the notification information. For example, the commerce asset can include one or more commercial offers (e.g., an offer for a discounted compression garment and another offer for sports watch with GPS functionality), and one or more components of the location-based transaction system 710 can send notification information indicative of the commerce asset to the mobile device 730d and/or to a server device of the business entity 750. In some embodiments, such as the embodiment illustrated in FIG. 8, the location-based transaction system can include a notification component (e.g., notification component 840) that can send the notification information, via a communication component (e.g. one of the communication components 850), to the mobile device 730d. It is noted that in the embodiment shown in FIG. 8, a bus architecture 875 (also referred to as a bus 875) can permit or otherwise facilitate the exchange of information (e.g., data, metadata, and/or signaling) between two or more of the business entity identification component 810, the crowd detection component 820, the analytics component 830, the notification component 840, the information storage 860, and at least one of the communication components 850. The bus 875 can be embodied in or can include a system bus, a memory bus, a control bus, a combination thereof, or any other type of bus architecture for the exchange of information. The bus 1180 can permit wireless communication (e.g., optically switched communication), wireline communication, or a combination of both.

A mobile device that receives notification information indicative of a commerce asset can present or otherwise output at least a portion of such information. To that end, in at least some embodiments, the mobile device can include a program module or another type of software application that can permit the mobile device to display or otherwise present a user interface that can include indicia, selectable or otherwise, that can permit consuming the notification information and associated information. The program module can include, for example, a specialty application or a software application germane to an operating system of the mobile device. The associated information can include data and/or metadata indicative or otherwise representative of a portion of the commerce asset. In addition or in other embodiments, the program module or the software application can permit or otherwise facilitate movement of the mobile device in response to reception of the notification information. The movement (e.g., a vibration) can convey at least a portion of the notification information. As an illustration, the mobile device 730d included in the crowd of mobile device including mobile devices 730a-730d can receive notification information indicative or otherwise representative of availability of commerce asset(s) and/or other information indicative or otherwise representative of the commerce asset(s). As described herein, the commerce asset(s) can include one or more transaction deals and, as illustrated, the mobile device 730d can display at least a portion of such information in a user interface (UI) 780. Selectable indicia 784 (labeled as "offer(s) 784") indicative or representative of the transaction deal(s) can be included in the UI 780. The selectable indicia 784 can be embodied in or can include, for example, graphical markings or other types of media representative of promotional content available to the mobile device 760. More specifically, in one example, the selectable indicia 784 can include a visual representation of a selectable hyperlink. In some implementations, selection of the indicia 784 can cause or otherwise instruct the mobile device 730d to display or otherwise present information associated with a transaction deal or an incentivation deal. For instance, in response to selection, the hyperlink can be executed in a web browser available to the mobile device 730d, directing the mobile device 730d to display details related to a transaction deal. Selection of the selectable indicia 784 (or any other selectable indicia of this disclosure) can be achieved, for example, via a click, a touch, a swipe, or other types of user-device interaction with the mobile device 730d. Prior to or in conjunction with (at least for a defined interval) presentation of the UI 780, the mobile device 730d can provide a haptic stimulus (e.g., a vibration) to convey notification information associated with the commerce asset(s) available to the mobile device 730d.

Continuing with the foregoing example, the selectable indicia 784 also can include selectable indicia 788 (labeled "Transaction 788") that can be associated with particular promotional content (e.g., a coupon or an offer for sale of a product at a discounted price) related to a transaction deal of the offer(s) 784. In response to selection of the selectable indicia 788, the mobile device 730d can initiate a secure communication session and can permit or otherwise facilitate a commerce transaction between the mobile device 730d and an organization platform device of an organization platform 790. As such selection of the selectable indicia 788 can direct or otherwise cause the mobile device 730d to engage in commerce transaction with the organization platform device. Therefore, the mobile device 730d can send transaction information (data, metadata, and/or signaling) associated with the commerce transaction, including session information related to establishment of the secure communication session with the location-based transaction system 710 and implementation information related to performance of the commerce transaction. While not shown, the selectable indicia 784 can further include selectable indicia that, in response to selection, can direct a mobile device displaying such indicia to cease the display of the indicia 784. Similarly, in one embodiment, the selectable indicia 784 also can include other selectable indicia (not depicted) that can permit navigating or otherwise consuming displayed or otherwise presented information.

Some commerce assets can be leveraged for transactions between the mobile and an organization platform device in other ways. In some implementations, a portion of the selectable indicia 784 can include a machine-readable code (e.g., a bar code (two-dimensional or otherwise) or another type of marking) that can be read or otherwise accessed at a specific business entity (e.g., business entity 750) within a cell sector or cell in which the mobile device is located. In one example, the barcode can be representative of a discount for goods (e.g., a consumer product, a meal, a drink, or the like) or services (e.g., a massage, a tattoo, or the like). A point-of-sale (POS) device, a self-serve dispensing device, or another type of device at a location of the specific business entity can access the portion of the selectable indicia 784 and can utilize such information in order to fulfill or facilitate fulfilling a transaction between the mobile device and the specific business entity and/or the organization platform 790. For instance, the POS device can include a barcode scanner that can access a barcode present in the selectable indicia 784. The POS device can send the accessed information to a device of the organization platform 790 and/or to the location-based transaction system 710 in order to effect a promotion associated with the barcode. The accessed information can be sent to such a device via, for example, communication links (wireless links, wireline links, and/or devices for transmission and/or routing of information). The communication links are shown as arrows and labeled "Pathway II" in FIG. 7. Further, as part of the transaction, transaction information in accordance with this disclosure can be sent from the POS device (or one of the other type of devices) to the location-based transaction system 710. In addition or in other embodiments, the POS device (or one of the other type of devices) can send the transaction information to the device of the organization platform 790 via the Pathway II. The device of the organization platform 790 can permit or otherwise facilitate applying a promotion related to the commerce asset associated with the selectable indicia 784. To that end, for example, such a device can apply a discount to a price of a good or service, or can award loyalty points or other type of information associated with a loyalty program. The device can send information indicative of the discount and/or the awarded loyalty points to the POS device. The location-based transaction system 710 can receive such information from the device, via links 716, and can send the information to the mobile device via Pathway I.

Figure 10:
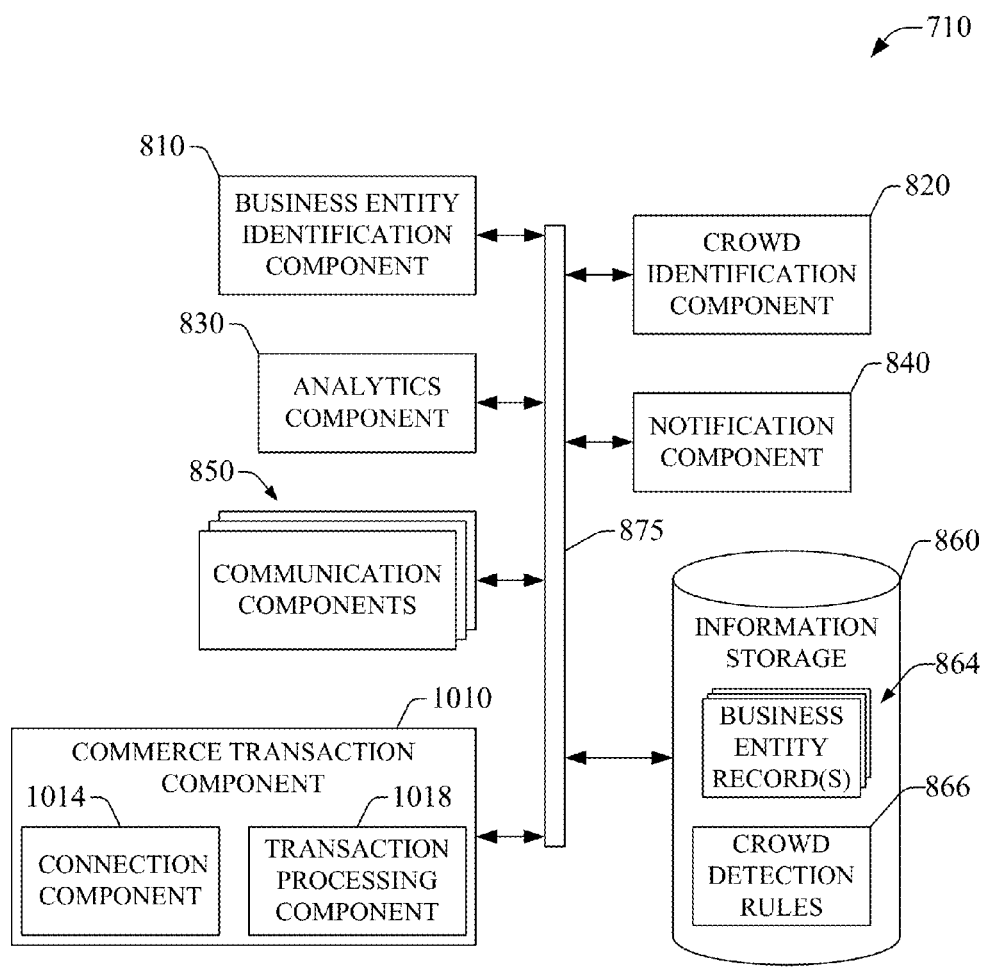
FIG. 10 presents an example of another location-based transaction system in accordance with one or more embodiments of the disclosure.

In some embodiments, the location-based transaction system 710 can permit or otherwise facilitate commerce transactions between an organization platform 790 and a mobile device of a crowd of mobile devices as described herein. FIG. 10 presents an example of such embodiments. As illustrated in the example embodiment, the location-based transaction system 710 can include a commerce transaction component 1010 that can permit the mobile device (e.g., mobile device 730d) to establish a communication session with the location-based transaction system 710. The communication session can be secure and can permit exchange of transaction information—e.g., product information, order information, personal information, financial information, a combination thereof, or the like—between an organization platform device (e.g., a server device of the organization platform 790) and the mobile device. The communication session also can permit the exchange of the transaction information between a device (e.g., a server device) of a business entity or another type of organization entity and the mobile device. In some embodiments, the business entity (e.g., a coffee shop) can be associated with the organization platform 790 (e.g., a network of devices providing cloud services). The communication session can be secured by standard and/or proprietary cryptography means. A connection component 1014 can initiate and maintain the secured communication session. Tunneling protocols and/or information associated with mechanisms to initiate and/or maintain a secure the communication session can be retained in the information storage 860.

The commerce transaction component 1010 also can include a transaction processing component 1018 that performs a number of operations related to a commerce transaction between an organization platform and a device of the group of devices. The operations can be performed as a service to the organization platform and can include processing of payments for goods or services in an order, management of delivery information and/or return of goods, processing of claims related to unsatisfactory products or services, and the like. The operation can utilize transaction information received at the location-based transaction system 710 within the communication session associated with the commerce transaction. Information to perform such operations and/or information resulting from such operations can be stored at the information storage 860.

It is noted that in the embodiment shown in FIG. 10, the bus 875 can permit or otherwise facilitate the exchange of information (e.g., data, metadata, and/or signaling) between two or more of the business entity identification component 810, the crowd detection component 820, the analytics component 830, the notification component 840, the information storage 860, at least one of the communication components 850, or the commerce transaction component 1010.

The location-based transaction system 710 can monetize the detection of a crowd of mobile devices and the distribution of commerce assets by assessing a fee or otherwise sharing revenue with an organization platform that engages in a commercial transaction with a mobile device in the crowd of mobile devices. Thus, in one example, the commerce transaction component 1010 can determine a revenue allocation between the organization platform and the location-based transaction system 710.

While the location-based transaction system 710 is illustrated as being external to an organization entity (e.g., business entity 150), the disclosure is not limited in that respect and in some embodiments, the location-based transaction system 710 can be deployed or otherwise configured within device(s) in the premises of the organization entity. In other embodiments, the location-based transaction system 710 can be distributed across at least one of such device(s) and the organization platform 790.

Figure 11:
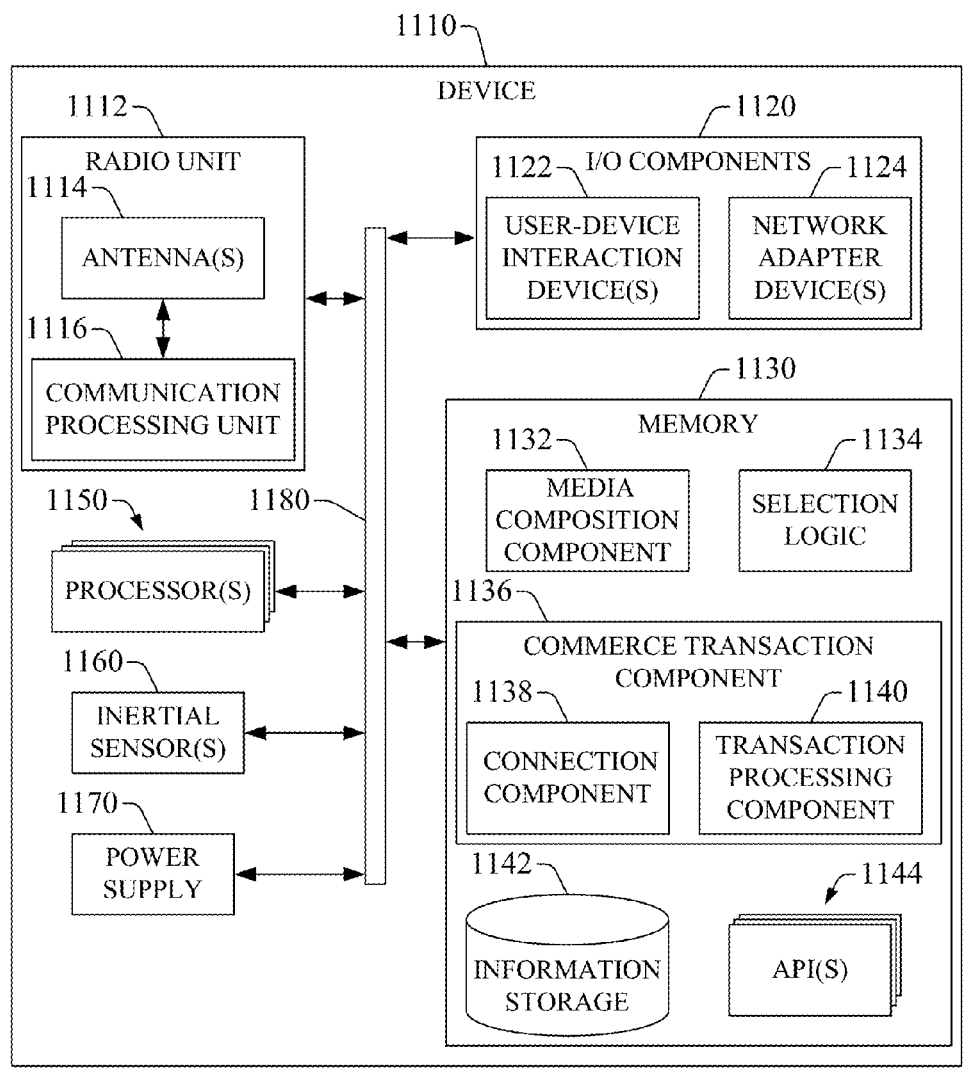
FIG. 11 presents an example of a device for crowd-location based transactions in accordance with one or more embodiments of the disclosure.

FIG. 11 presents an example of a device 1110 for crowd-location based transactions in accordance with one or more embodiments of this disclosure. The device 1110 can embody any of the mobile devices of this disclosure. As illustrated, the device 1110 includes a radio unit 1112 that can receive strength information wirelessly from a communications head device. The radio unit 905 can include one or more antenna(s) 906 that can receive data or other type of information wirelessly. Each of the data or the information can be modulated and/or encoded according to a specific radio technology protocol, such as a point-to-point short-range communication protocol, such as BLUETOOTH® low energy (LE), ZigBee®, or other proprietary or non-proprietary communication protocols. As such, the radio unit 1112 can include a communication processing unit 1116 that can demodulate, decode, and/or otherwise process the information received wirelessly. In some implementations, at least a portion of the radio unit 1112 can embody or can constitute a receiver for GNSS signals.

The device 1110 also includes input/output (I/O) components 1120 that can permit the exchange of information (e.g., data, metadata, and/or signaling) between the device 1110 and an external device (e.g., a mobile device, a network device of the access network 120 or other devices, or the like). As illustrated, the I/O components 1120 can include one or more user-device interaction devices 1122 and one or more network adapter devices 1124. The user-device interaction devices 1122 can permit sending output information to an end-user and/or receiving input information from the end-user. More specifically, the user-device interaction devices 1122 can include a display device that can be sensitive to touch or other type of contact with an external conducting element associated with an end-user. The display device can present indicia (selectable or otherwise) within a graphical user interface, as disclosed herein. The indicia can include media of one or more types, such as still pictures (e.g., an icon, a thumbnail, a photograph, or a combination thereof) and/or motion pictures, such as animations and video segments including videos with augmented reality elements. A motion picture can be displayed in response to selection of selectable indicia associated with a commerce asset, where the motion picture can provide details or other type of information associated with an asset (merchandise, services, etc.) related to the commerce asset. The motion picture can include audio, which can be provided by a speaker or other type of audio output device that can be included in the user-device interaction device(s) 1122. The speaker or an audio device also can provide sounds (voice, ringtones or other aural alerts, etc.) associated with a commerce asset and/or other functionality of the device 1110. Similarly, the user-device interaction device(s) 1122 also can include a microphone (e.g., a solid-state microelectromechanical microphone) to receive speech (e.g., voice commands) and/or other type of audible sound. In addition or in the alternative, the microphone can receive ultrasonic signals.

In addition or in other scenarios, the user-device interaction devices 1122 also can include a haptic device (e.g., mechanical components) that can permit or otherwise facilitate movement of the device 1110 in response to indicia (selectable or otherwise) associated with a commerce asset. Specifically, in one example, the haptic device can direct or otherwise cause the device 1110 to move (e.g., vibrate) to convey a notification that a commerce asset or a promotional asset is available to the device 1110 (which can embody or can constitute the mobile device 130*d*, for example).

The I/O components 1120 also can include one or more network adapter devices 1124 that can permit sending information to a remote device and/or receiving information from the remote device. The information can be digital and/or analog, and can include data, metadata, signaling, audio output signal, video output signal, and/or a haptic signal (e.g., a control electric signal indicative of a vibration to be effected). The network adapter(s) 1124 can include various elements having different structure to couple communicatively, electrically, mechanically, and/or electromechanically the device 1110 to different types of remote devices or to a single remote device having more than one input interface. As such, the network adapter(s) 1124 can include ports (serial and/or parallel) for communication according to various interfaces, such as X.21, Recommended Standard (RS) number 232 (RS-232), General Purpose Interface Bus (GPIB), Ethernet, Universal Serial Bus (USB), IEEE 1394, and the like. Such ports can include, for example, a D15 connector, a D25 connector, a 30-pin connector, a modular connector, a Registered Jack (RJ) connector, GPIB connector, FireWire connector, a combination thereof, or the like.

As illustrated, in the embodiment shown in FIG. 11, the device 1110 can include one or more computer-accessible storage devices 1130 (referred to as memory 1130) that can retain a media composition component 1132, selection logic 1134, and a commerce transaction component 1136, each configured to perform or otherwise facilitate at least some of the functionality described herein in connection with presentation of content and/or performance of a transaction related to a commerce asset. Specifically, each of the media composition component 1132, the selection logic 1134, and the commerce transaction component 1136 can perform or otherwise facilitate such functionality in response to being executed by at least one of the processor(s) 1150.

In one implementation, the media composition component 1132, the selection logic 1134, and the commerce transaction component 1136 can be embodied in or can constitute respective computer-accessible storage devices including respective groups of computer-accessible instructions. In another implementation, one or more the media composition component 1132, the selection logic 1134, and the commerce transaction component 1136 can be distributed over two or more of the computer-readable storage devices of the memory 1130. Computer-accessible instructions can include, for example, computer-readable instructions and/or computer-executable instructions. Computer-readable instructions can be embodied in or can include, for example, computer-readable programming code, and computer-executable instructions can be embodied in or can include, for example, computer-executable programming code.

The media composition component 1132 can include computer-executable instructions or other type of computer-accessible code (e.g., computer-readable programming code and/or computer-executable programming code). At least a portion of the computer-executable instructions or at least a portion of the other type of computer-accessible code can be configured to be executed by at least one of the processor(s) 1150. Therefore, the media composition component 1132 can be configured to be executed by the at least one of the processor(s) 1150. In one example scenario, the device 1110 can receive asset information indicative or otherwise representative of a commerce asset suitable for or otherwise associated with the device 1110. The commerce asset can be determined or otherwise selected in accordance with aspects of this disclosure. In response to the received information, at least one of the processor(s) 1150 can execute the media composition component 1132 to present or otherwise display at least a portion of the asset information. In one implementation, in response to execution, the media composition component 1132 can format or otherwise process the asset information according to a defined UI in which a commerce asset is to be conveyed. As part of formatting of the asset, the media composition component 1132 can generate indicia representative of at least a portion of the commerce asset, e.g., the media composition component can generate a specific selectable icon or thumbnail representative of a commerce offer included in the commerce asset. In further response to execution, the media composition component 1130 can cause or otherwise direct a display device of the user-device interaction device(s) 1122 to present the indicia in the defined UI. To that end, at least one of the processor(s) 1150 can send information (analog data and/or digital data) representative of the markings and/or the defined UI to the display device. As a result, the indicia indicative or otherwise representative of the commerce asset can be displayed by the device 1110.

As described herein, indicia indicative or otherwise representative of a commerce asset can be selectable. As such, in some instances, the display device that presents such selectable indicia can generate a control signal (e.g., an interruption) in response to selection of the selectable indicia. One of the processor(s) 1150 can send the control signal to a process or thread associated with execution of the selection logic 1134, which can include computer-executable instructions or other type of computer-accessible code configured to be executed by at least one of the processor(s) 1150. The control signal can include payload data indicative of the selectable indicia that is selected and, based on the payload data, the selection logic 1134 in execution can direct the media composition component 1132 to instruct the device 1110 to present information indicative of the selection. In response, the media composition component 1132 in execution can cause or otherwise direct the display device described herein to present indicia indicative or otherwise representative of the selection. As described herein, to that end, at least one of the processor(s) 1150 can send information (analog data and/or digital data) representative of the indicia to the display device, which can present the indicia.

In some scenarios, as described herein, displayed indicia associated with a commerce asset can include selectable indicia that, in response to selection, can cause the device 1110 to engage in a transaction with a remote device (e.g., a network device of an organization platform). In such scenarios, selection of the selectable indicia (e.g., transaction 788 in FIG. 7) can generate control signal (e.g., an interruption) that can be received at a processor of the processor(s) 1150. The processor can send the control signal to a process or thread associated with execution of the selection logic 1134. Based at least on the control signal, the selection logic 1134 in execution can direct or otherwise instruct the commerce transaction component 1136 to initiate a transaction between the device 1110 and a remote device, such as a device of the location-based transaction system 710 and/or a device of an organization entity (e.g., business entity 150) located in a cell sector or cell in which the device 1110 is located. The commerce transaction component 1136 can perform or otherwise facilitate functionality similar to that of the commerce transaction component 410. While the initiation of a transaction is described with respect to selection of indicia, it is noted that the disclosure is not so limited and other user-device interaction can be utilized to initiate the transaction. For instance, initiation of the transaction can be speech-controlled, where the device 1110 (or a mobile device embodied by it) can initiate the transaction in response to a defined speech keyword or phrase. To that end, the user-device interaction device(s) 1122 can include a microphone and related circuitry (which can include a processor of the processor(s) 1150) to process speech received at the device and detect the defined keyword or phrase. In response to such detection, the device 1110 can initiate the transaction.

The commerce transaction component 1136 can include computer-executable instructions or other type of computer-accessible code. At least a portion of the computer-executable instructions or at least a portion of the other type of computer-accessible code can be configured to be executed by at least one of the processor(s) 1150. A control signal responsive to selection of selectable indicia indicative of a transaction related to a commerce asset can trigger execution of the commerce transaction component 1136. As illustrated, in some embodiments, the commerce transaction component 1136 can include a connection component 1138 that, in response to execution by at least one of the processor(s) 1150, can permit or otherwise facilitate the device 1110 to establish a secure communication session with a remote device associated with the location-based transaction system 110. In one implementation, the remote device can be embodied in or can include a server device including the commerce transaction component 410. To that end, in one example, one or more prompts for input information pertinent to establishment of the secure communication session can be displayed or otherwise presented at the device 1110. For instance, the media composition component 1132 can be directed to generate markings indicative of the prompt(s) and to send information indicative of the markings to a display device and/or another type of user-device interaction device (e.g., a speaker). A processor configured to execute or executing the media composition component 1132 can send such information. The input information received in response to the prompts can include, for example, information indicative of an identity of the device 1110 (e.g., a communication address), information indicative of credentials associated with an end-user, information indicative of a response to a challenge-response test (e.g., a completely automated public Turing test to tell computers and human apart (CAPTCHA)), a combination thereof, or the like. In addition, the processor(s) configured to execute or executing the connection component 1138 can send such input information to the radio unit 1112 for transmission to the remote device.

Upon or after a secure communication session is established, execution by at least one of the processor(s) 1150 of the transaction processing component 1140 can permit or otherwise facilitate execution of a transaction related to a commerce asset (or information indicative thereof) received at the device 1110. Execution of the transaction processing component 1140 can perform or otherwise facilitate functionality similar to that provided or otherwise facilitated by the commerce transaction component 1010.

As illustrated, in the embodiment shown in FIG. 11, the device 1110 can include one or more inertial sensors 1160 that can probe the translational motion and/or rotational motion of the device 1110 and can generation motion information (e.g., analog data and/or digital data) indicative or otherwise representative of the acceleration and/or orientation (e.g., roll, pitch, and/or yaw) of the device 1110. The inertial sensor(s) 1160 can include a solid-state accelerometer and/or a solid-state gyroscope.

In addition, the device 1110 can include a power supply 1170 that can energize one or more functional elements that operate within the device 1110. In one example, the power supply 1170 can include one or more transformers to achieve power level(s) to operate the device 1110 and the functional elements and related circuitry therein. The power supply 1170 can be embodied in or can include a rechargeable or non-rechargeable battery. Accordingly, the power supply 1170 can attach to a conventional power grid in order to recharge and/or or to ensure that the device 1110 is operational. To that end, one of the network adapter device(s) 1124 can include a connector to functionally attach the power supply 1170, via the bus 1180, for example, to the conventional power grid. In addition or in other embodiments, the power supply 1170 can include an energy conversion component (not shown) such as a solar panel, a thermoelectric device or material, and/or another type of energy storage material in order to provide additional or alternative power resources or autonomy to the device 1110.

As illustrated in FIG. 11, the device 1110 can include one or more memory elements 1142 (referred to as information storage 1142) including data, metadata, and/or instructions (e.g., software libraries, communication protocols, graphical protocols, or the like) that can permit or otherwise facilitate at least some of the functionality of device 510 as described herein. In addition, the device 1110 can include one or more application programming interfaces 1144 that can permit or otherwise facilitate exchange of information between elements of a process or thread of execution associated with the described functionality of the device 1110. For instance, at least one of API(s) 1144 can permit exchange of information between the media composition component 1132 and the selection logic 1134.

Two or more of the functional elements included in the device 1110 in the example embodiment shown in FIG. 11 can exchange information (e.g., data, metadata, and/or signaling) via one or more bus architectures (referred to as bus 1180). The bus 1180 can be embodied in or can include a system bus, a memory bus, a control bus, a combination thereof, or any other type of bus architecture for the exchange of information. The bus 1180 can permit wireless communication (e.g., optically switched communication), wireline communication, or a combination of both.

In the embodiment illustrated in FIG. 11, the media composition component 1132, the selection logic 1134, and the commerce transaction component 1136 can embody or can constitute a software application that can provide the functionality described herein in connection with aspects of this disclosure. In some embodiments, rather than being retained in the memory 1130, each of the media composition component 1132 and the commerce transaction component 1134 can include circuitry to process information and provide the functionality described herein in connection with presentation of information associated with a commerce asset and a related transaction in accordance with this disclosure. Each of such components also can include memory elements configured to retain information, such as a portion of the selection logic 1132 or information that can be utilized in a transaction associated with a commerce asset. More specifically, in at least one of such embodiments, the media composition component 1132 and the commerce transaction component 1134 can be embodied in or can include respective integrated circuits or chipsets having processing elements and/or storage elements, such as an application specific integrated circuit (ASIC), a programmable field gate array (PFGA), or the like. As such, the embodiments may be referred to as a firmware embodiment. In other embodiments, the media composition component 1132 and the commerce transaction component 1134 can be integrated into a single chipset or circuitry to process information and provide the functionality described herein.

In view of the aspects described herein, example methods that can be implemented in accordance with this disclosure can be better appreciated with reference to FIGS. 12-16. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, one or more example methods disclosed herein can alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages described herein. It should be further appreciated that the example methods disclosed throughout the subject specification are capable of being stored on an article of manufacture to facilitate transporting and transferring such example methods to computers for execution, and thus implementation, by a processor or for storage in a memory.

Methods disclosed throughout the subject specification and annexed drawings are capable of being stored on an article of manufacture to facilitate transporting and transferring such methodologies to computers for execution, and thus implementation, by a processor or for storage in a memory. In an aspect, one or more processors that enact method(s) described herein can be employed to execute code instructions retained in a memory, or any computer- or machine-readable medium, to implement method(s) described herein; the code instructions, when executed by the one or more processor implement or carry out the various acts in the method(s) described herein. The code instructions provide a computer- or machine-executable framework to enact the method(s) described herein.

Figure 12:
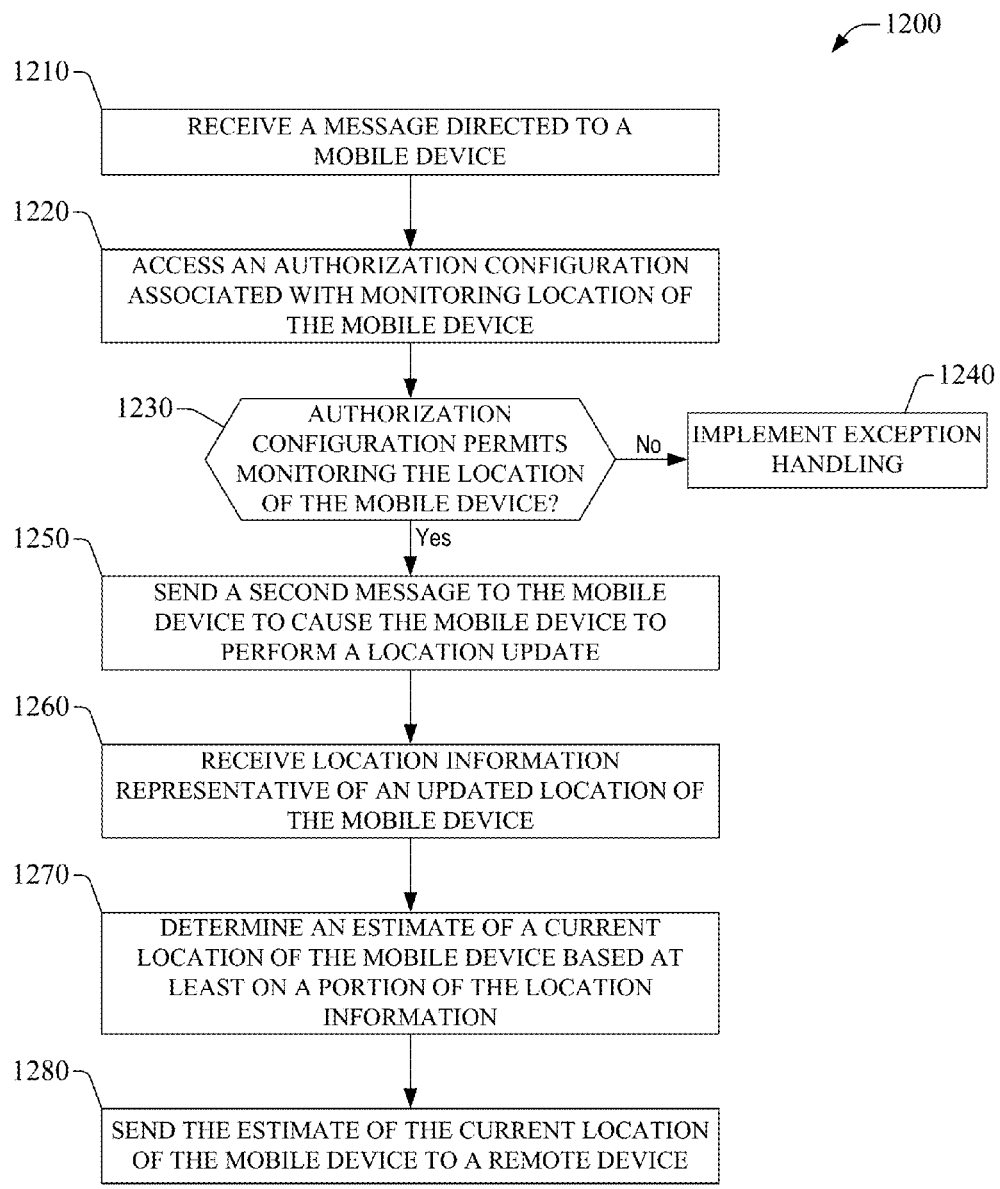
FIG. 12 presents an example of a method for determining a location of a mobile device in accordance with one or more embodiments of the disclosure.

FIG. 12 presents a flowchart of an example method 1200 for determining location of a mobile device in accordance with one or more embodiments of the disclosure. The example method can be implemented, entirely or in part, by a computing system having processors, memory devices, and/or other computing resources. In some embodiments, the computing system can be embodied in or can include the location monitoring system 120 described herein in connection with FIG. 1. At block 1210, a message directed to a mobile device (e.g., mobile device 160) can be received by the computing system. The message can convey a request for an estimate of a current location of the mobile device, and can be embodied in or can include, for example, a SMS message, an MMS message, a SIP INVITE message, a USDD message, or the like. A communication component (e.g., a web-based gateway) of the computing system can receive the message. In some implementations, the component can be embodied in or can include a web-based gateway device. In other implementations, the component can be embodied in or can include a mobile switching center (MSC) device. As described herein, the message can be originated at or otherwise provided by a remote device deployed within a first network (e.g., represented as "Network A" in FIG. 1) that is different from a second network (e.g., represented as "Network B" in FIG. 1) that provides wireless service or other services to the mobile device. The first network can embody or can include a platform for electronic commerce or a platform for law enforcement.

At block 1220, an authorization configuration associated with monitoring location of the mobile device can be accessed by the computing system. As described herein, the authorization configuration can be retained or otherwise recorded within a profile of the mobile device, and can include information (e.g., opt-in information or opt-out information) indicative or otherwise representative of permission or lack thereof to monitor the location of the mobile device. It is noted that, as described herein, the authorization configuration is accessed in response to the message received by the computing system at block 1210. In addition, in some embodiments, the authorization configuration can be preconfigured or otherwise predetermined prior to reception of such a message and without operation of the mobile device to such an end. More specifically, in one example, the authorization configuration can be stored by a storage device in a communication network (e.g., stored at a HSS device or HLR device) in connection with a process of provisioning or activating the mobile device.

At block 1230, the computing system can determine if the authorization configuration permits monitoring the location of the mobile device. To that end, the computing system can determine if the authorization configuration includes opt-in information that conveys permission to monitor the location of the mobile device. As described herein, the opt-in information also can specify scope of the permission to monitor the location of the mobile device, e.g., period during which location can be monitored, devices permitted to monitor the location of the mobile device, conditions or events under which location of the mobile device can be monitored, a combination thereof, or the like. In a scenario in which it is ascertained that the authorization configuration does not include opt-in information or includes opt-out information specifying that monitoring of the location of the mobile device is refused ("No" branch), the computing system can implement exception handling at block 1240. As described herein, in one example, implementing the exception handling can result in rejection of the request conveyed in the message received at block 1210. In the alternative, in a scenario in which it is ascertained that the authorization configuration includes opt-in information that authorizes monitoring the location of the mobile device, the computing system can send a second message to the mobile device at block 1250. The second message can cause the mobile device to perform a location update. In some embodiments, the second message can be embodied in a control message within a standardized protocol for generation of a location update of the mobile device, such a location area update (LAU) in UMTS or a location determination procedure in E-911.

At block 1260, location information representative of an updated location of the mobile device can be received by the computing system. The location information can be received by a component (e.g., location component 132) of the computing system that is configured to determine and/or update a current location of the mobile device. At block 1270, an estimate of the current location of the mobile device can be determined, by the computing system, based at least on a portion of the location information.

At block 1280, the estimate of the current location of the mobile device can be sent, by the computing system, to a remote device. For example, the remote device can be embodied in or can include the location requestor device 110. As described herein, a communication component (e.g., a web-based gateway device or a MSC device) of the computing system can send the estimate of the current location to the remote device. In some implementations, as described herein, the remote device can be deployed (e.g., installed, configured, and accepted) at a platform for electronic commerce. In other implementations, as described herein, the remote device can be deployed at a platform for law enforcement.

Figure 13:
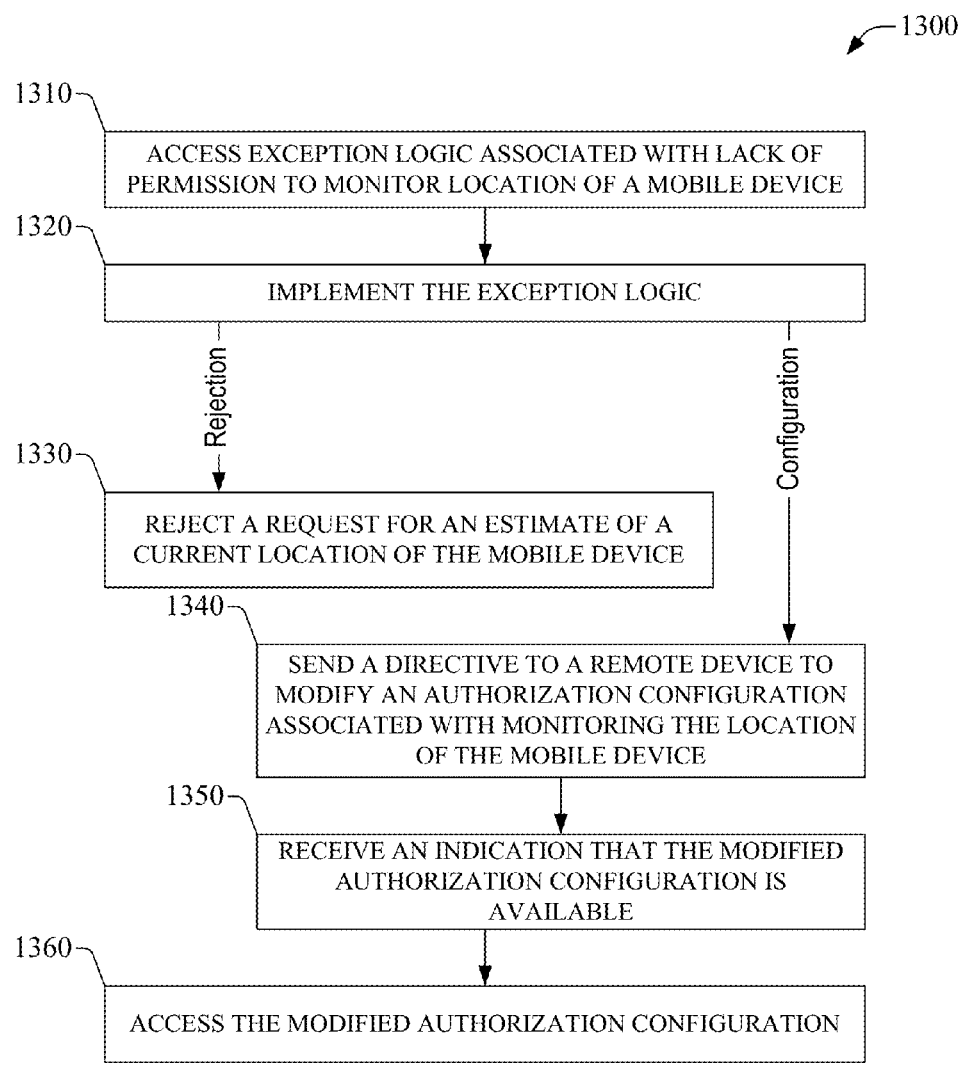
FIG. 13 presents an example of a method for handling an exception in determining a location of a mobile device in accordance with one or more embodiments of the disclosure.

FIG. 13 presents a flowchart of an example method 1300 for exception handling in connection with determining location of mobile devices in accordance with one or more embodiments of the disclosure. The example method can be implemented, entirely or in part, by a computing system having processors, memory devices, and/or other computing resources. In some embodiments, the computing system can be embodied in or can include the location monitoring system 120 described herein in connection with FIG. 1. More specifically, in one of such embodiments, the location access component 128 can implement the example method.

At block 1310, exception logic associated with lack of permission to monitor location of a mobile device can be accessed by the computing system. The exception logic can be accessed, for example, in response to an authorization configuration having opt-out information that specifies that location of the mobile device is not to be tracked. At block 1320, the exception logic can be implemented. In one embodiment, the location access component 128 in the location monitoring system 120 can access the exception logic and can implement it.

Various outcomes are possible in response to implementation of the exception logic. As illustrated, one outcome can include rejection of a request for an estimate of a current location of the mobile device. As such, at block 1330, the request for the estimate of the current location of the mobile device can be rejected. Rejecting such a request can include sending a message to the remote device that originated the request. The message can be embodied in a SMS message, a MMS message, a simple network management protocol (SNMP) message, or the like. A second outcome can include configuration of the authorization configuration including the opt-out information that caused the exception. Such an outcome ("Configuration" in FIG. 13) can result in several operations. For example, at block 1340, the computing system can send a directive to modify the authorization configuration to a remote device (e.g., configuration device 310). In addition, at block 1350 the computing system can receive an indication that a modified authorization configuration is available (e.g., stored in a device profile associated with the mobile device). As described herein, the modified authorization configuration can include opt-in information representative or otherwise indicative of permission to monitor the location of the mobile device.

The method 1300 can contemplate retrying access to authorization configurations after a modification is implemented in response to the accessed exception logic. Thus, at block 1360, the modified authorization configuration can be accessed.

It is noted that humans are incapable of performing all of the blocks of the methods 1200 and 1300. Therefore, the various aspects of method 1200 and method 1300 cannot be mere implementations of human activities nor as disembodied, mental or abstract operations or embodiments. For example, the method 1200 includes wireless exchange of messages over a wireless and/or a non-wireless network. In another example, the method 1200 includes determination of an estimate of location of a mobile device using location information received wirelessly. The wireless reception of the location information alone conveys that a human relying on mental operations or mere pen and paper cannot implement at least such a determination block simply because information received wirelessly generally is demodulated and/or decoded according to a complex modulation and coding scheme. Thus, it is readily apparent that humans cannot perform at least the determination of the estimate of the current location of the mobile device that is described herein.

Figure 14:
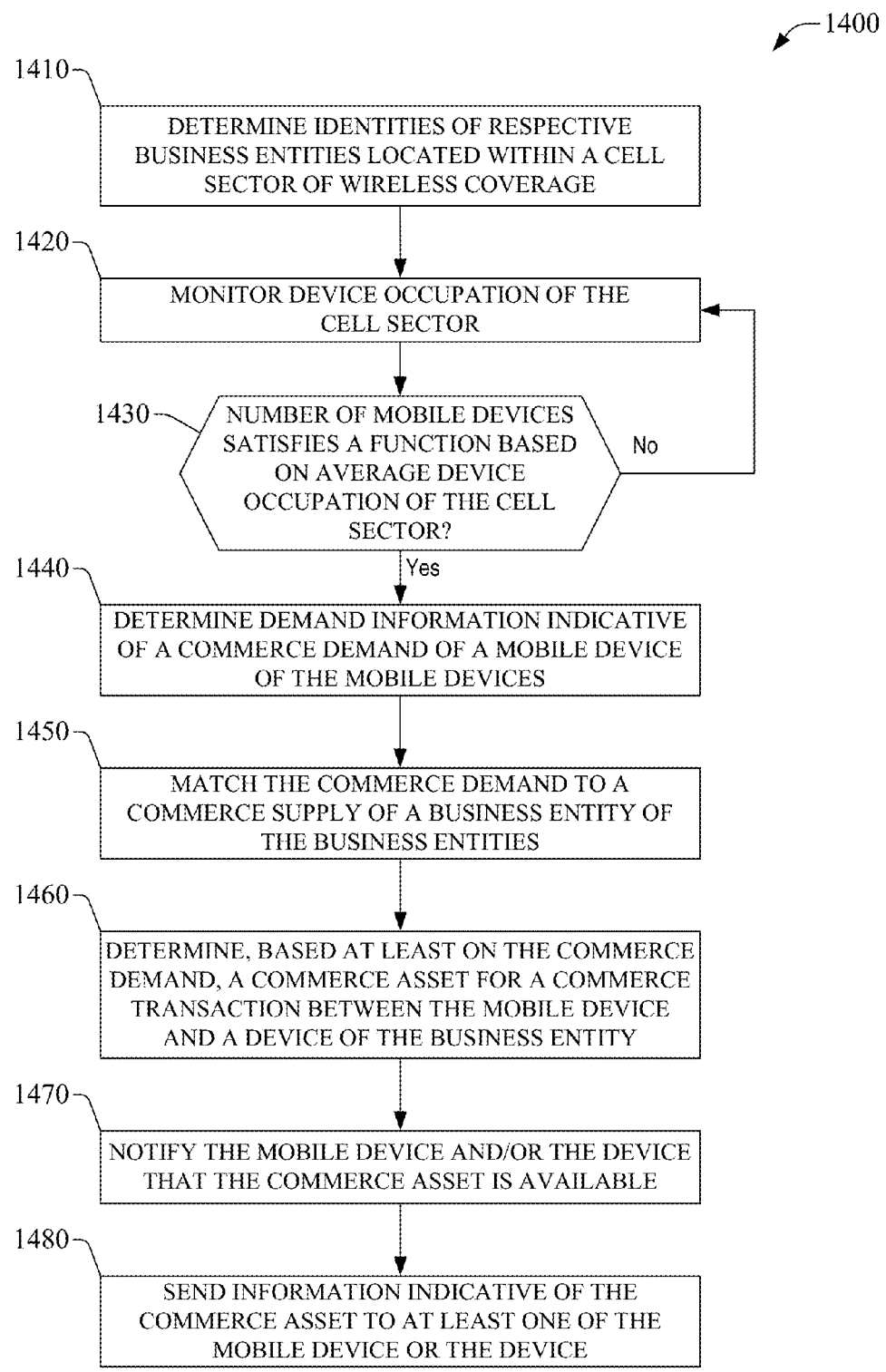
FIG. 14 presents an example of a method for supplying commerce information in accordance with one or more embodiments of the disclosure.

FIG. 14 presents a flowchart of an example method 1400 for supplying commerce information in accordance with one or more embodiments of the disclosure. The example method can be implemented, entirely or in part, by a computing system having processors, memory devices, and/or other computing resources. In some embodiments, the computing system can be embodied in or can include the location-based transaction system 110 described herein with respect to FIG. 7, for example. At block 1410, identities of respective business entities located within a cell sector of wireless coverage (e.g., region 160) can be determined by the computing system. Determining such identities can include dividing a geographic area according to cell sectors a cell plan associated with wireless service coverage, and associating location information (e.g., data and/or metadata) indicative or otherwise representative of a location of a business entity within the geographic area to a identification information indicative or otherwise representative of a cell sector in the cell plan. As described herein, in one example, the location information can be embodied in or can include an address or geographic coordinates, and the identification information can be embodied in or can include a CID or a LCID.

At block 1420, device occupation of the cell sector can be monitored by the computing system. At block 1430, the computing system can determine if the number of mobile devices within the cell sector satisfies a defined function based at least on average device occupation of the cell sector. For instance, the defined function (or, in some embodiments, a test) can include a relational operator relative to the average device occupation of the cell sector over a specific time interval and to an occupation threshold. As described herein, the occupation threshold can be determined based on various factors and can be, for example, specific to a business entity of the business entities in block 1410. In one implementation, the occupation threshold can be represented as $N_{th}$ (a natural number) and can be defined with respect to an average occupation $<N>$ of the cell sector. The average can be a rolling average over a defined interval (e.g., one week, one month, 12 months, etc.). For instance, as described herein, the occupation threshold can be defined as $N_{th}=<N>+\Delta N$, wherein $\Delta N$ is an occupation offset with respect to the average occupation of the cell.

In a scenario in which the computing system ascertains that number of mobile devices is equal to or less than the threshold (e.g., "No" branch), the flow of the example method can be re-directed to block 1420. In the alternative, in a scenario in which the computing system ascertains that the number of mobile devices is greater than the threshold (e.g., "Yes" branch), a demand information indicative or otherwise representative of a commerce demand of a mobile device of the mobile devices can be determined (e.g., predicted) or otherwise determined at block 1440. The computing system can determine such a demand information. As described herein, in some embodiments, an analytics component (e.g., analytics component 830) of the computing system can perform such a prediction or determination. To determine the demand information, in one implementation, the computing system (via the analytics component, for example) can access first information indicative of demographics of an end-user associated with the mobile device and second information indicative of services received from a wireless service provider. The first and second information can be accessed from a device profile of the mobile device. As described herein, the device profiled can be retained in a home subscriber server (HSS) device, a home location register (HLR) device, or another type of computer-readable storage device (such as the profile(s) 142 in FIG. 1). The computing system can leverage or otherwise utilize the accessed first information and second information to determine the demand information indicative or otherwise representative of the commerce demand. In one example, the demand information can be inferred from at least the first and second information. As such, an inference of the demand information can embody or otherwise constitute a prediction of the commerce demand (or, in some embodiments, a commerce interest). As described herein, in some implementations, a component of the computing system can perform or otherwise facilitate artificial intelligence (AI) methods to infer (e.g., reason and draw a conclusion based upon a set of metrics, arguments, or known outcomes in controlled scenarios) the commerce demand (or, in some embodiments, a commerce interest).

At block 1450, the commerce demand can be matched, by the computing system, to a commerce supply of a business entity of the business entities in block 1410. At block 1460, the computing system can determine, based at least on the commerce demand, a commerce asset (or, in some embodiments, a promotional asset) for a commerce transaction between the mobile device and a device of the business entity.

At block 1470, the mobile device and/or the device of the business entity can be notified, by the computing system, that the commerce asset is available. In some embodiments, the device of the business entity can be embodied in or can include a server device of the business entity, such as an email server or a server that administers operations of the business entity. In such embodiments, the computing system can send a message to a communication address of the server device, where the message can include information indicative of availability of the commerce asset. As described herein, in some implementation, a notification can be sent to the mobile device via a communication pathway that can partially overlap with another communications pathway utilized or otherwise leverage to send the notification to the device of the business entity.

At block 1480, the computing system can send information indicative or otherwise representative of the commerce asset to at least one of the mobile device or the device of the business entity. In one embodiment, as described herein, the device of the business entity can be embodied in or can include a server device of the business entity. As such, the computing system can send a message to a communication address of the server device, where the message can include information indicative or otherwise representative of the commerce asset. As described herein, in some implementations, a notification can be sent to the mobile device via a communication pathway that can partially overlap with another communications pathway utilized or otherwise leverage to send the notification to the device of the business entity.

As described herein, the notification information and the information indicative of the commerce asset can be utilized at the mobile device that receives such information. Specifically, in some embodiments, an HTTP application, a MAP application, and/or a specialty software application process the information in order to present indicia (selectable or otherwise) and/or to provide other types of stimuli (audio or movement) indicative or otherwise representative of the notification information and/or the information indicative of the commerce asset. In addition, at least the specialty software application can permit or otherwise facilitate a transaction with a remote network device based at least on a portion of the information indicative of the commerce asset (e.g., an advertisement, a coupon, an award, or the like).

While the example method 1400 is described with reference to a commerce demand, the example method is not limited in that respect and, in addition or in other embodiments, the example method can be implemented (e.g., executed) with respect to a transactional demand for an asset and/or for a specific type of transaction. It is noted that humans are incapable of performing all of the blocks of the example method 1400. Therefore, the various aspects of the example method 1400 cannot be mere implementations of human activities nor as disembodied, mental or abstract operations or embodiments.

Figure 15:
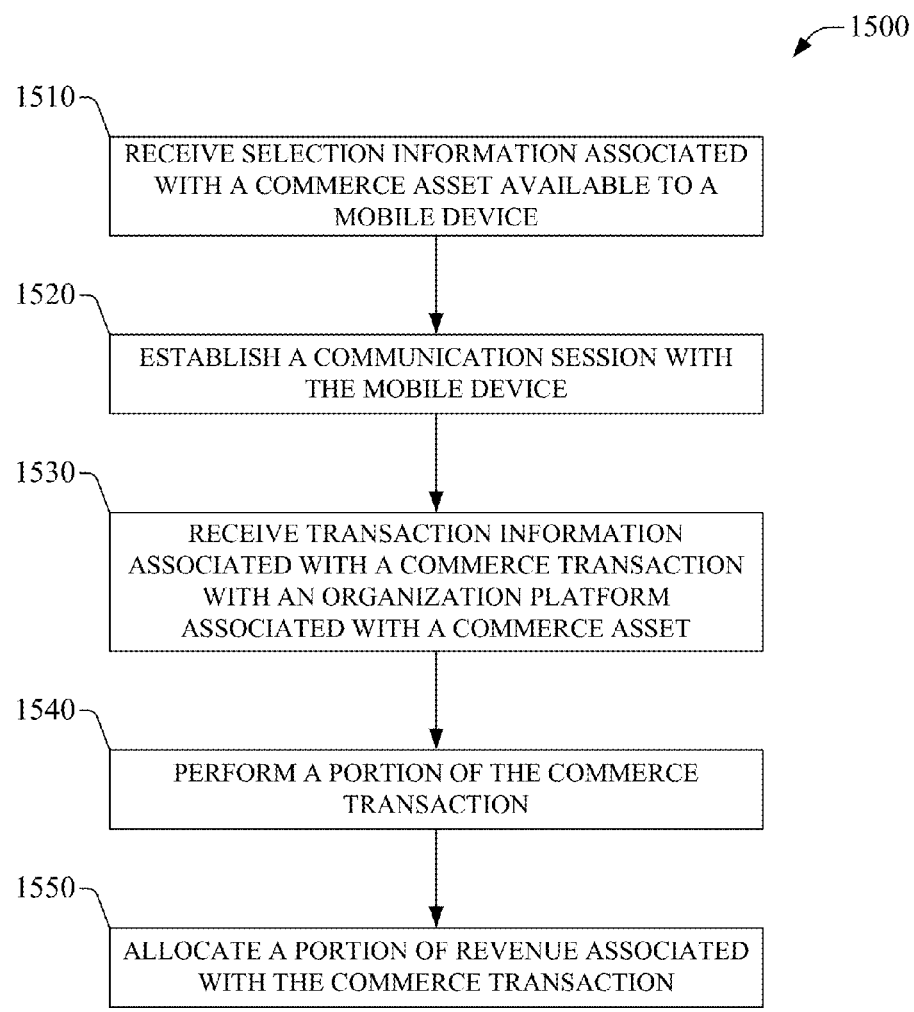
FIGS. 15-16 present an example of a method for conducting a commerce transaction in accordance with one or more embodiments of the disclosure.

FIG. 15 presents a flowchart of an example method 1500 for conducting a commerce transaction in accordance with one or more embodiments of the disclosure. The example method can be implemented, entirely or in part, by a computing system having processors, memory devices, and/or other computing resources. In some embodiments, the computing system can be embodied in or can include the location-based transaction system 110 described herein with respect to FIG. 7, for example. At block 1510, selection information associated with a commerce asset available to a mobile device can be received by the computing system. At block 1520, the computing system can establish a communication session with the mobile device. At block 1530, the computing system can receive transaction information associated with a commerce transaction with an organization platform and/or an organization entity (e.g., a business entity) associated with a commerce asset. In one embodiment, the transaction information can be received at a point-of-sale (POS) device located at facility (e.g., business entity 750) associated with the organization platform or the organization entity. The POS device can send the transaction information to the location-based transaction system 710 or to a device of computing system that implements the subject example method. At block 1540, a portion of the commerce transaction can be performed or otherwise facilitated by the computing system. In one example, performing or otherwise facilitating the transaction can include processing of credentials associated with mobile device and/or electronic payments. In addition or in another example, performing or otherwise facilitating the transaction can include processing (e.g., procuring) a shipment of goods (consumer goods or otherwise) associated with the transaction. At block 1550, a portion of the revenue associated with the commerce transaction can be allocated by the computing system. Specifically, in one embodiment, the revenue can be allocated to an entity (e.g., a MSO) that deploys and/or administers the computing system (e.g., the location-based transaction system 110). In certain implementations, the portion of the revenue can be allocated according to a defined agreement between such an entity and the organization platform and/or the organization entity.

It is noted that humans are incapable of performing all of the blocks of the example method 1500. Therefore, the various aspects of the example method 1500 cannot be mere implementations of human activities nor as disembodied, mental or abstract operations or embodiments.

Figure 16:
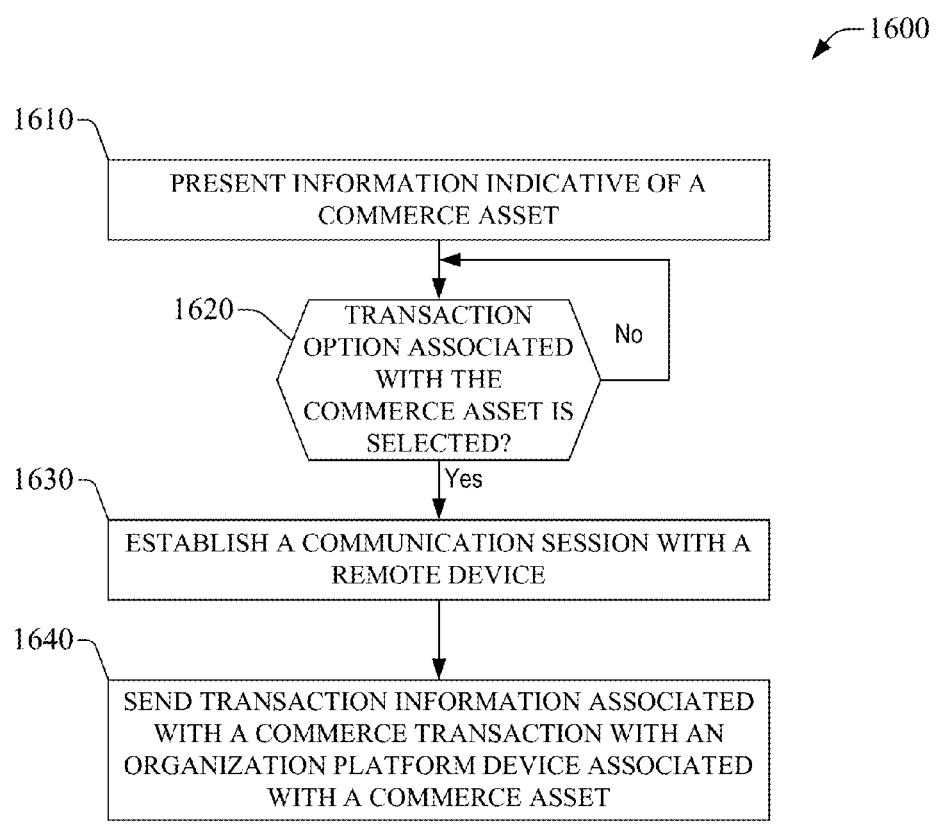

FIG. 16 presents a flowchart of an example method 1600 for conducting a commerce transaction in accordance with one or more embodiments of the disclosure. The example method can be implemented, entirely or in part, by a computing device having processors, memory devices, and/ or other computing resources. In some embodiments, the computing device can be embodied in or can include the mobile device 1110 described herein with respect to FIG. 11, for example. At block 1610, information indicative or otherwise representative of a commerce asset (or, in some embodiments, a promotional asset) can be presented by the computing device. As described herein, in some implementations, the computing device can display such information, at least a portion of which can be embodied in or can include selectable markings (e.g., a selectable icon, a selectable thumbnail, other types of selectable images, a combination thereof, or the like).

At block 1620, the computing device can determine if a transaction option (e.g., transaction 188 in FIG. 1) associated with the commerce asset is selected. In one implementation, the computing device (e.g., device 1110) can receive input information indicative or otherwise representative of the transaction option. The input information can be received via a user-device interaction device (such as a touch-screen display device or a microphone) in response to a selectable marking displayed at block 1610. In a scenario in which it is ascertained that the commerce asset is not selected, flow of the example method can be redirected to block 1620. Thus, the computing device can continue to monitor for selection or dismissal of the commerce asset. In the alternative, in a scenario in which it is ascertained that the commerce asset is selected, a communication session with a remote device (e.g., a component of the location-based transaction system 110) can be established by the computing device at block 1630.

At block 1640, the mobile device can send transaction information associated with a commerce transaction with an organization platform device associated with the commerce asset. In some embodiments, the mobile device can send the transaction information to the location-based transaction system 710 via, for example, the access network 720.

It is noted that humans are incapable of performing all of the blocks of the example method 1600. Therefore, the various aspects of the example method 1600 cannot be mere implementations of human activities nor as disembodied, mental or abstract operations or embodiments.

Figure 17:
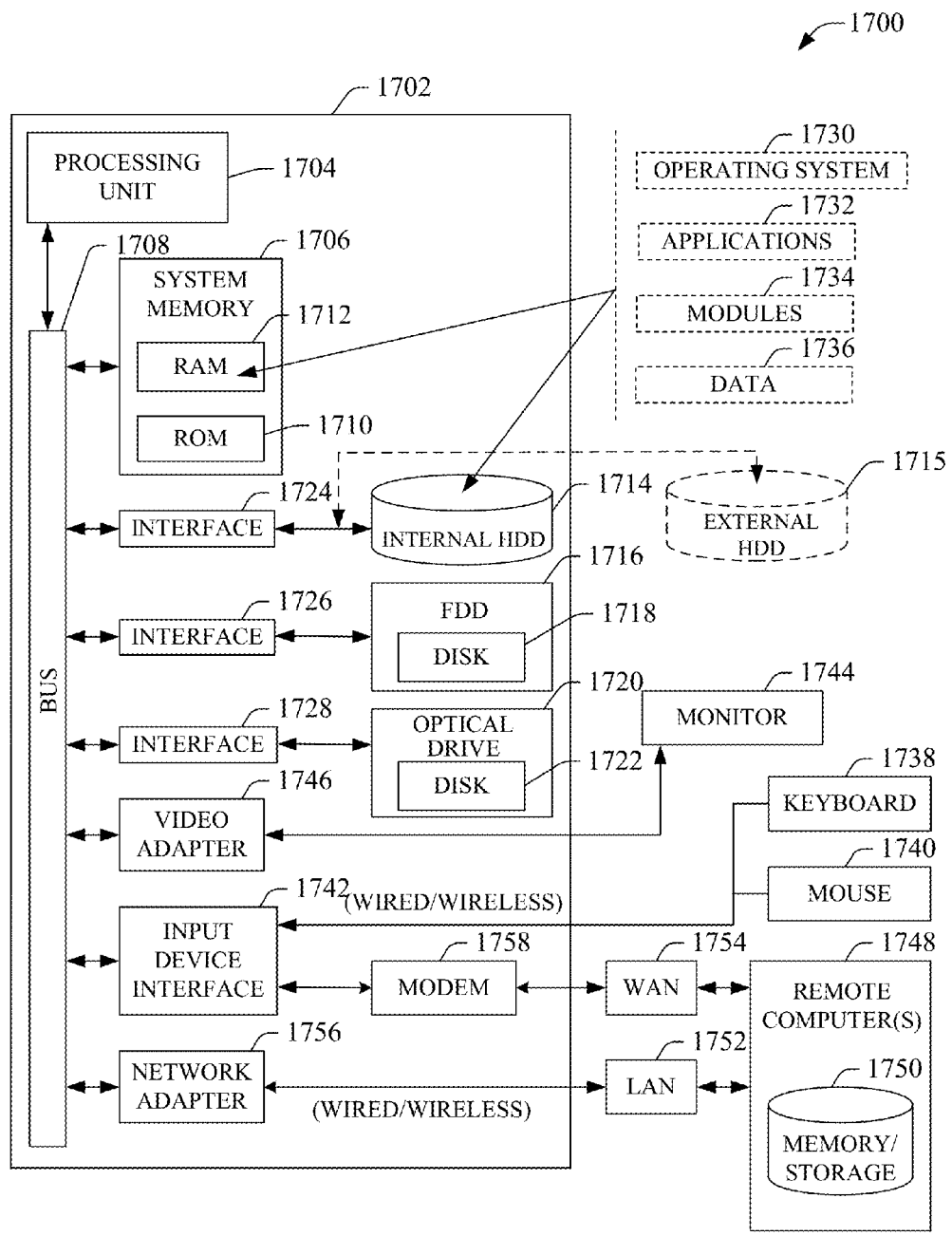
FIG. 17 presents an example of a computing environment that can implement determination of a location of a mobile device in accordance with one or more embodiments of the disclosure.

In order to provide additional context for various aspects of this disclosure, FIG. 17 and the following discussion are intended to provide a brief, general description of a suitable example computing environment 1700 in which the various aspects of the specification can be implemented. Example computing environment 1700 can embody several of the components or layers described herein. In addition, example computing environment 1700 can execute or otherwise implement components, or portions thereof, implemented as software application(s) or firmware applications(s). Memory elements that are part of computing environment 1700 can embody or can constitute various data stores described in the one or more embodiments of the subject disclosure. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable storage devices. Computer-readable storage device can include computer-readable storage media embodied in or including any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With further reference to FIG. 17, the example environment 1700 for implementing various aspects of the specification includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures may also be employed as the processing unit 1704.

The system bus 1708 can be any of several types of bus structure that may further interconnect to a memory bus (with or without a memory controller), a peripheral bus, and a local bus using any of a variety of commercially available bus architectures. The system memory 1706 includes read-only memory (ROM) 1710 and random access memory (RAM) 1712. A basic input/output system (BIOS) is stored in a non-volatile memory 1710 such as ROM, EPROM, EEPROM, which BIOS contains the basic routines that help to transfer information between elements within the computer 1702, such as during start-up. The RAM 1712 can also include a high-speed RAM such as static RAM for caching data.

The computer 1702 further includes an internal hard disk drive (HDD) 1714 (e.g., EIDE, SATA), which internal hard disk drive 1714 may also be configured for external use in a suitable chassis (not shown), or an external HDD 1715 can be present in addition to internal HDD 1714, a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1702, the drives and media accommodate the storage of any data in a suitable digital format. Although the description of computer-readable media above refers to a HDD, a removable magnetic diskette, and a removable optical media such as a CD or DVD, it is noted by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is appreciated that the specification can be implemented with various commercially available operating systems or combinations of operating systems.

A user can enter commands and information into the computer 1702 through one or more wired/wireless input devices, e.g., a keyboard 1738 and a pointing device, such as a mouse 1740. Other input devices (not shown) may include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 1394 serial port, a game port, a USB port, an IR interface, etc.

A monitor 1744 or other type of display device is also connected to the system bus 1708 via an interface, such as a video adapter 1746. In addition to the monitor 1744, a computer typically includes other peripheral output devices (not shown), such as speakers, printers, etc.

The computer 1702 may operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which may connect to a global communications network, e.g., the Internet.

When used in a LAN networking environment, the computer 1702 is connected to the local network 1752 through a wired and/or wireless communication network interface or adapter 1756. The adapter 1756 may facilitate wired or wireless communication to the LAN 1752, which may also include a wireless access point disposed thereon for communicating with the wireless adapter 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 via the serial port interface 1742. In a networked environment, program modules depicted relative to the computer 1702, or portions thereof, can be stored in the remote memory/storage device 1750. It will be appreciated that the network connections shown are example and other means of establishing a communications link between the computers can be used.

The computer 1702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks can operate in the unlicensed 2.4 and 5 GHz radio bands, at a 9 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 18:
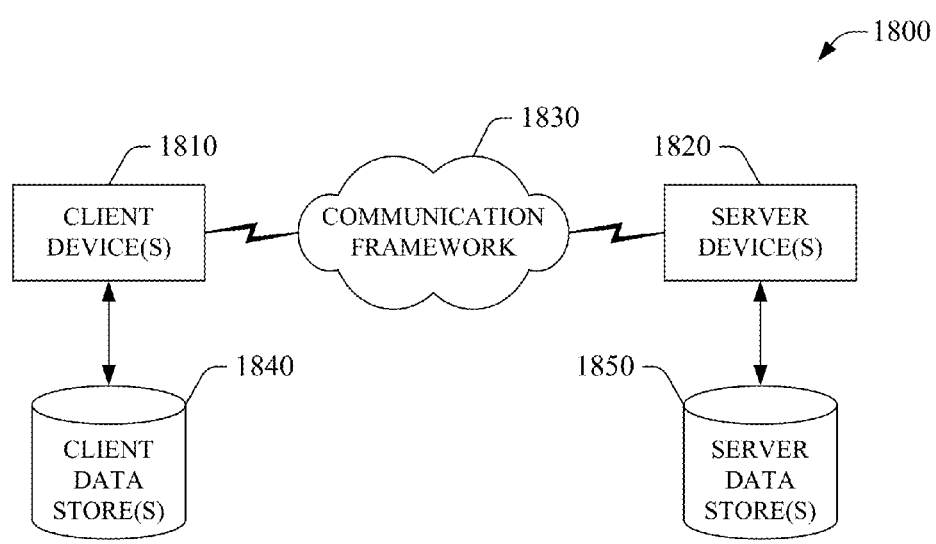
FIG. 18 illustrates another example of a computing environment in accordance with one or more embodiments of the disclosure.

FIG. 18 illustrates a schematic block diagram of an example computing system 1800, in accordance with aspects described herein. The example computing system 1800 includes one or more client devices 1810. The client device(s) 1810 can be embodied in or can include hardware and/or software (e.g., threads, processes, computing devices). The example computing system 1800 also includes one or more server device(s) 1820. Thus, the example computing system 1800 can correspond to a two-tier client server model or a multi-tier model (e.g., client, middle tier server, data server), amongst other models. The server device(s) 1820 also can be embodied in or can include hardware and/or software (e.g., threads, processes, computing devices). The server device(s) 1820 can house threads to perform transformations by employing the subject disclosure, for example. One example communication between a client device of the client device(s) 1810 and a server device of the server device(s) 1820 may be in the form of a data packet transmitted between two or more computer processes.

The example computing system 1800 includes a communication framework 1830 that can be employed to perform or otherwise facilitate communications between a client device of the client device(s) 1810 and a server device of the server device(s) 1820. The client device(s) 1810 can be operatively connected to one or more client data store(s) 1840 that can be employed to store information local to the client device(s) 1810. Similarly, the server device(s) 1820 are operatively connected to one or more server data store(s) 1850 that can be employed to store information local to the server(s) 1820.

In the present description, for purposes of explanation, numerous specific details have been set forth in order to provide a thorough understanding of the disclosure. It may be evident, however, that the subject disclosure may be practiced without these specific details. In other instances, well-known structures and devices are shown in block diagram form in order to facilitate describing the subject disclosure.

As used in this disclosure, including the annexed drawings, the terms "component," "system," "platform," "unit," "interface," and the like are intended to refer to a computer-related entity or an entity related to an operational apparatus with one or more specific functionalities, wherein the entity can be either hardware, a combination of hardware and software, software, or software in execution. One or more of such entities are also referred to as "functional elements." As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, node, coder, decoder, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings.

Furthermore, the terms "user," "subscriber," "customer," "consumer," "prosumer," "agent," and the like are employed interchangeably throughout the subject specification, unless context warrants particular distinction(s) among the terms. It is noted that such terms can refer to human entities or automated components supported through artificial intelligence (e.g., a capacity to make inference based on complex mathematical formalisms) which can provide simulated vision, sound recognition and so forth.

The term "processor," as utilized in this disclosure, can refer to any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. Moreover, a memory component can be removable or affixed to a functional element (e.g., device, server).

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various embodiments described herein can be implemented as a method, apparatus, or article of manufacture using standard programming and/or engineering techniques. In addition, various of the aspects disclosed herein also can be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

What has been described above includes examples of systems and methods that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
identifying, by a system comprising a processor, identities of respective business entities located within a cell sector of wireless service coverage;
determining, by the system, that a number of mobile devices that occupy the cell sector at a defined time satisfies a defined function that is based on an average occupation of the cell sector by the mobile devices over a defined time interval and a business type of the respective business entities, wherein the number of the mobile devices that occupy the cell sector at the defined time satisfies the defined function at least in part by the number of the mobile devices being determined to be greater than a defined threshold number that is equal to an average occupation number representing the average occupation of the cell sector by the mobile devices over the defined time interval in addition to an occupation offset number associated with a business entity of the respective business entities; and
in response to the determining,
determining, by the system, demand information representative of a transactional demand of a mobile device of the mobile devices based on a profile of the mobile device,
matching, by the system, the transactional demand to a commerce supply of the business entity, wherein the business entity is determined to be occupying the cell sector, and
determining, by the system, based on the transactional demand, a commerce asset associated with the commerce supply for a transaction between the mobile device and a device associated with the business entity, wherein the device is configured to fulfill a portion of the transaction.

2. The method of claim 1, further comprising:
sending, by the system, information indicative of the commerce asset to the mobile device and the device, wherein the commerce asset comprises a transaction deal representing an incentive to perform the transaction.

3. The method of claim 1, wherein the determining that the number of the mobile devices that occupy the cell sector at the defined time satisfies the defined function comprises:
determining the defined threshold number based on the average occupation of the cell sector by the mobile devices over the defined time interval and information relating to the defined threshold number that is associated with the business entity;
determining whether the number of the mobile devices is greater than the defined threshold number; and
monitoring occupation of the cell sector by the mobile devices at different times comprising the defined time.

4. The method of claim 1, wherein the matching comprises:
assigning a first location to the mobile devices; and
selecting an identity of the identities of the respective business entities based on the first location and a defined threshold distance.

5. The method of claim 4, wherein the selecting comprises selecting the business entity having the identity and being located at a second location separated from the first location by a distance less than the defined threshold distance.

6. The method of claim 4, wherein the assigning comprises:
determining respective locations of respective mobile devices of a subset of the mobile devices that occupy the cell sector;
determining an average location of the respective locations based on the respective locations; and
configuring the average location as the first location.

7. The method of claim 1, wherein the determining the demand information of the mobile device comprises:
accessing, from the profile, first information indicative of demographics of an end-user identity associated with the mobile device and second information indicative of services received from a network device of a wireless service provider; and
inferring the transactional demand using the first information and the second information.

8. A system, comprising:
a processor; and
a memory that stores executable instructions that, when executed by the processor, facilitate performance of operations, comprising:
determining that a number of mobile devices that are located in a cell sector at a defined time satisfies a defined function that is based on an average number of mobile devices located in the cell sector over a defined time period and respective business types of respective business entities located in the cell sector, wherein the number of the mobile devices that are located in the cell sector at the defined time satisfying the defined function comprises the number of the mobile devices being determined to exceed a threshold number that is determined based on the average number and an offset factor associated with a business entity of the respective business entities;

in response to the determining that the number of the mobile devices that are located in the cell sector at the defined time satisfies the defined function, determining demand information representative of a transactional demand associated with a mobile device of the mobile devices based on a profile of the mobile device associated with a user identity; and determining, based on the transactional demand, a commerce asset for a transaction between the mobile device and a device associated with the business entity, wherein the device is configured to fulfill a portion of the transaction, wherein the device is determined to be located within the cell sector, and wherein the commerce asset is associated with a supply of the commerce asset associated with the business entity.

9. The system of claim 8, wherein the operations further comprise:

transmitting information relating to the commerce asset to the mobile device and the device, and wherein the commerce asset comprises a transaction offer representing an incentive to perform the transaction.

10. The system of claim 8, wherein the operations further comprise:

determining the threshold number based on the average number of mobile devices located in the cell sector over the defined time period and data relating to the threshold number, and wherein the data is associated with the business entity.

11. The system of claim 8, wherein the operations further comprise:

monitoring occupation of the cell sector by the mobile devices at respective times comprising the defined time; and determining whether the number of the mobile devices exceeds the threshold number.

12. The system of claim 8, wherein the operations further comprise:

assigning a first location to the mobile devices; and selecting the business entity of the respective business entities based on the first location and a defined threshold distance.

13. The system of claim 12, wherein the selecting comprises selecting the business entity based on the business entity being determined to be located at a second location that is separated from the first location by a distance less than the defined threshold distance.

14. The system of claim 12, wherein the operations further comprise:

determining respective locations of respective mobile devices of a subset of the mobile devices that are located in the cell sector;

determining an average location of the respective locations based on the respective locations; and configuring the average location as the first location.

15. The system of claim 8, wherein the operations further comprise:

obtaining, from the profile, first data relating to demographics of the user identity associated with the mobile device and second data relating to services received from a network device of a wireless service provider; and determining the transactional demand based on the first data and the second data.

16. The system of claim 8, wherein the operations further comprise:

storing respective profiles associated with the mobile devices in distributed data storage devices that are distributed throughout a communication network, and wherein the respective profiles comprise the profile.

17. The system of claim 8, wherein the operations further comprise:

mapping respective location data of respective locations of the respective business entities to a geographic area associated with the cell sector.

18. A non-transitory machine-readable storage medium, comprising executable instructions that, when executed by a processor, facilitate performance of operations, comprising:

determining that a number of communication devices, which are located in a cell coverage area at a defined time, satisfies a defined function that is based on an average number of communication devices located in the cell coverage area over a defined time period and respective business types of respective business entities located in the cell coverage area, wherein the defined function is satisfied when the number of the communication devices is determined to be greater than a defined threshold number that is determined based on the average number and an occupation offset value associated with a business entity of the respective business entities;

in response to the determining that the number of the communication devices that are located in the cell coverage area at the defined time satisfies the defined function, determining demand information representative of a transactional demand associated with a communication device of the communication devices based on a profile of the communication device associated with a user identity; and determining, based on the transactional demand, a commerce asset for a transaction between the communication device and a device associated with the business entity, wherein the device is configured to fulfill a portion of the transaction, wherein the device is determined to be located within the cell coverage area, and wherein the commerce asset is associated with a supply of the commerce asset associated with the business entity.

19. The non-transitory machine-readable storage medium of claim 18, wherein the operations further comprise:

communicating information relating to the commerce asset to the communication device and the device, wherein the commerce asset comprises a promotional offer representing an incentive to perform the transaction.

20. The non-transitory machine-readable storage medium of claim 18, wherein the operations further comprise:

determining respective locations of respective communication devices of a subset of the communication devices that are located in the cell coverage area, wherein the subset of the communication devices comprises the communication device;

determining an average location of the respective locations based on the respective locations;

configuring the average location as a first location;

assigning the first location to the subset of the communication devices; and selecting the business entity of the respective business entities based on the first location, a second location associated with the business entity, and a defined threshold distance, wherein the second location is determined to be less than the defined threshold distance away from the first location.

* * * * *